(12) United States Patent
Igeta et al.

(10) Patent No.: US 11,347,112 B2
(45) Date of Patent: May 31, 2022

(54) DISPLAY DEVICE

(71) Applicant: Japan Display Inc., Tokyo (JP)

(72) Inventors: Koichi Igeta, Tokyo (JP); Hirotaka Imayama, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/095,928

(22) Filed: Nov. 12, 2020

(65) Prior Publication Data
US 2021/0063791 A1  Mar. 4, 2021

Related U.S. Application Data

(63) Continuation of application No. 16/191,865, filed on Nov. 15, 2018, now abandoned, which is a continuation of application No. 14/815,409, filed on Jul. 31, 2015, now Pat. No. 10,310,309.

(51) Int. Cl.
*G02F 1/1339* (2006.01)
*G02F 1/1335* (2006.01)
*G02F 1/1333* (2006.01)

(52) U.S. Cl.
CPC ...... *G02F 1/1339* (2013.01); *G02F 1/133512* (2013.01); *G02F 1/13394* (2013.01); *G02F 1/13398* (2021.01); *G02F 1/133311* (2021.01)

(58) Field of Classification Search
CPC ............. G02F 1/1339; G02F 1/133512; G02F 1/13398; G02F 1/133311; G02F 1/13394
See application file for complete search history.

(56) References Cited

U.S. PATENT DOCUMENTS

| 8,363,199 B2 * | 1/2013 | Sekiya ................. G02F 1/1339 349/153 |
| 2013/0088672 A1 * | 4/2013 | Shin .................. G02F 1/136209 349/110 |
| 2015/0131041 A1 * | 5/2015 | Moriwaki ......... G02F 1/133345 349/106 |

* cited by examiner

*Primary Examiner* — Angela K Davison
(74) *Attorney, Agent, or Firm* — Michael Best & Friedlich LLP

(57) ABSTRACT

To improve the display quality of a display device, the display device includes a display section and a frame section surrounding a periphery of the display section. A substrate in the display device includes a conductor pattern constituting a circuit section and an insulating film serving as an organic film covering the conductor pattern. The insulating film extends to a peripheral edge of the substrate. A slit, which penetrates the insulating film in a thickness direction, is formed in a corner part of the insulating film. The slit is formed at a position not overlapping the circuit section.

7 Claims, 14 Drawing Sheets

DISPLAY DEVICE

CROSS-REFERENCE TO RELATED APPLICATIONS

This application is a continuation of U.S. patent application Ser. No. 16/191,865, filed on Nov. 15, 2018, which, in turn, is a continuation of U.S. patent application Ser. No. 14/815,409 (now U.S. Pat. No. 10,310,309), filed on Jul. 31, 2015. Further, this application claims priority from Japanese Patent Application No. 2014-163175 filed on Aug. 8, 2014, the entire contents of which are hereby incorporated by reference into this application.

TECHNICAL FIELD OF THE INVENTION

The present invention relates to a technique effectively applied to a display device in which a pair of substrates is oppositely arranged and a display functional layer such as a liquid crystal layer is formed between the opposing substrates.

BACKGROUND OF THE INVENTION

There is a display device that seals the periphery of a display functional layer such as a liquid crystal layer by arranging the display functional layer between a pair of substrates oppositely arranged. Japanese Patent Application Laid-Open No. 2014-26199 (Patent Document 1) discusses forming a slit serving as a region where there is no black matrix around a sealing material, and blocking water entering a display functional layer from an interface between the substrate and a black matrix.

A display device has a configuration in which a display functional layer such as a liquid crystal layer is formed between a pair of substrates, the substrates are adhesively fixed to each other with a sealing material in a sealing section around the display functional layer, so that the display functional layer is protected.

An organic film composed of an organic material such as resin is formed as a protective film and a light shielding film, for example, in substrates oppositely arranged. If the organic film is thus formed in the substrate, water easily enters the display functional layer via the inside of the organic film or an interface between the organic film and the substrate. When water enters the display functional layer, a constituent material of the display functional layer changes in quality, so that a display functional characteristic may change. That is, entrance of water into the display functional layer causes a decrease in display quality.

A method for suppressing entrance of water into the display functional layer includes a method for forming a slit in an organic film so as to surround the periphery of a display region. The slit formed in the organic film is formed by removing the organic film so as to be penetrated in a thickness direction. In this case, a distance of an entrance path of water increases, so that entrance of water can be reduced.

If the slit is formed in the organic film so as to surround the periphery of the display region, however, a function required for the organic film cannot be exhibited in a portion where the slit is formed. If the slit is formed in the organic film formed as a protective film of a circuit pattern, for example, the circuit pattern in a portion overlapping the slit is not protected. Alternatively, if the slit is formed in the organic film formed as a light shielding film, a light shielding member for suppressing leakage of light needs to be formed in a location other than the portion where the slit is formed so as to suppress leakage of light from a portion where the slit is formed.

When measures taken when the function required for the organic film is not exhibited are considered in the portion where the slit is formed, therefore, the area of a portion referred to as a so-called frame section or frame region serving as a non-display portion surrounding the periphery of the display region is difficult to reduce.

SUMMARY OF THE INVENTION

The present invention is directed to providing a technique for improving the display quality of a display device.

A display device that is one aspect of the present invention includes a display section and a frame section surrounding a periphery of the display section. Further, the display device includes a first substrate having a first surface, a second substrate having a second surface opposing the first surface of the first substrate, a display functional layer arranged in the display section between the first substrate and the second substrate, and a circuit section provided in the frame section in the second substrate. Further, the second substrate includes a conductor pattern constituting the circuit section, and a first organic film covering the conductor pattern. Further, the first organic film extends to a peripheral edge of the second substrate. Further, a first slit, which penetrates the first organic film in a thickness direction, is formed in a corner part of the first organic film. Further, the first slit is formed at a position not overlapping the circuit section.

As another aspect of the present invention, the first organic film includes four corner parts, and the first slit is formed in each of the four corner parts.

As another aspect of the present invention, a plurality of the first slits are formed toward a peripheral edge of the display section from a peripheral edge of the first organic film in the corner part of the first organic film.

As another aspect of the present invention, the first slit is formed so as to draw a circular arc around a corner of the display section.

As another aspect of the present invention, the first organic film includes four corner parts, the first slit is formed in each of the four corner parts, and the first slit is not formed in sides among the four corner parts.

As another aspect of the present invention, both ends of the first slit respectively communicate with edges of the first organic film.

As another aspect of the present invention, the first substrate includes a light shielding film composed of an organic material, the light shielding film extends to a peripheral edge of the first substrate, a second slit, which penetrates the light shielding film in a thickness direction, is formed in the frame section in the light shielding film, and a light shielding member composed of an inorganic material is formed in a portion where the second slit is formed.

As another aspect of the present invention, the second slit is formed so as to continuously surround the display section.

A display device that is another aspect of the present invention includes a display section and a frame section surrounding a periphery of the display section. The display device includes a first substrate having a first surface, a second substrate having a second surface opposing the first surface of the first substrate, a display functional layer arranged in the display section between the first substrate and the second substrate, and a circuit section provided in the frame section in the second substrate. Further, the first substrate includes a light shielding film composed of an organic material, and the second substrate includes a conductor pattern constituting the circuit section. Further, the light shielding film extends to a peripheral edge of the first substrate. Further, a first slit, which penetrates the light shielding film in a thickness direction, is formed in a corner part of the light shielding film. Further, a light shielding member is formed at a position overlapping the first slit in a thickness direction in the second substrate, and the light shielding member is formed at a position not overlapping the circuit section.

As another aspect of the present invention, the light shielding film includes four corner parts, and the first slit is formed in each of the four corner parts.

As another aspect of the present invention, the light shielding film includes four corner parts, the first slit is formed in each of the four corner parts, and the first slit is not formed in sides among the four corner parts.

As another aspect of the present invention, both ends of the first slit formed in the light shielding film respectively communicate with edges of the light shielding film.

BRIEF DESCRIPTIONS OF THE DRAWINGS

DESCRIPTIONS OF THE PREFERRED EMBODIMENTS

Figure 1:
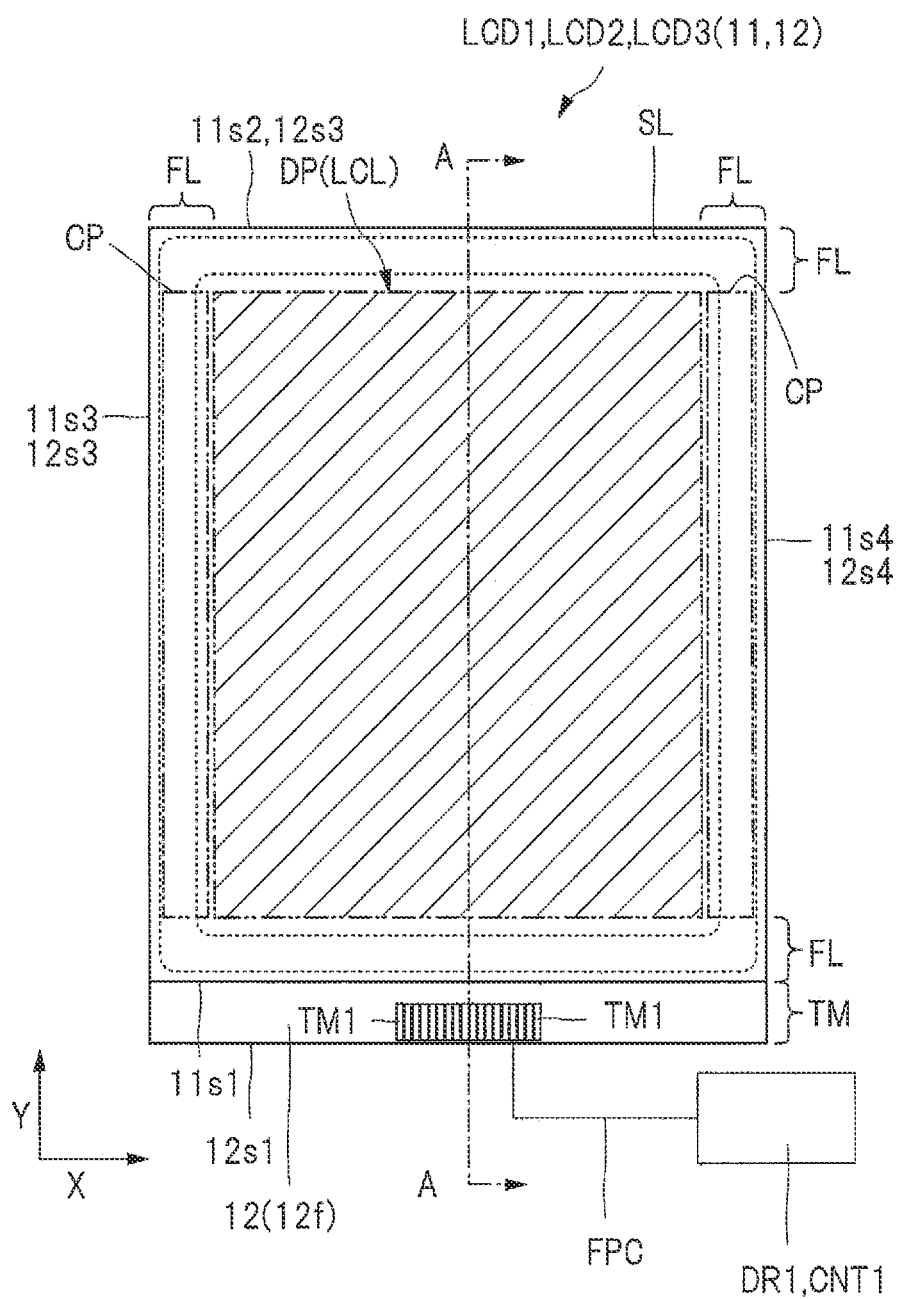
FIG. 1 is a plan view illustrating an example of a liquid crystal display according to the present embodiment.

Hereinafter, embodiments of the present invention will be described with reference to drawings. Note that the disclosures are provided by way of example, and any suitable variations easily conceived by a person with ordinary skill in the art while pertaining to the gist of the invention are of course included in the scope of the present invention. Further, in the drawings, widths, thicknesses and shapes of respective components may be schematically illustrated in comparison with the embodiments for the purpose of making the description more clearly understood, but these are merely examples, and do not limit the interpretations of the present invention. Further, in the specification and drawings, elements which are similar to those already mentioned with respect to previous drawings are denoted by the same reference characters, and detailed descriptions thereof will be suitably omitted.

In the following embodiment, a liquid crystal display including a liquid crystal layer serving as a display functional layer will be specifically described as an example of a display device. The liquid crystal display device is also broadly classified into two categories, described below, depending on an application direction of an electric field for changing an orientation of liquid crystal molecules in the liquid crystal layer serving as the display functional layer. More specifically, the first category is a so-called vertical electric field mode in which an electric field is applied in a thickness direction (or an out-of-plane direction) of the liquid crystal display device. Examples of the vertical electric field mode include a Twisted Nematic (TN) mode and a Vertical Alignment (VA) mode. The second category is a so-called horizontal electric field mode in which an electric field is applied in a planar direction (or an in-plane direction) of the liquid crystal display device. Examples of the horizontal electric field mode include an In-Plane Switching (IPS) mode and a Fringe Field Switching (FFS) mode serving as one type of the IPS mode. While a technique described below is applicable to both the vertical electric field mode and the horizontal electric field mode. However, a display device in the horizontal electric field mode will be described as an example in the present embodiment.

In the following embodiments, details of the frame section in the liquid crystal display will be described with a plurality of examples after a basic configuration of the liquid crystal display is described.

<Basic Configuration of Liquid Crystal Display>

Figure 2:
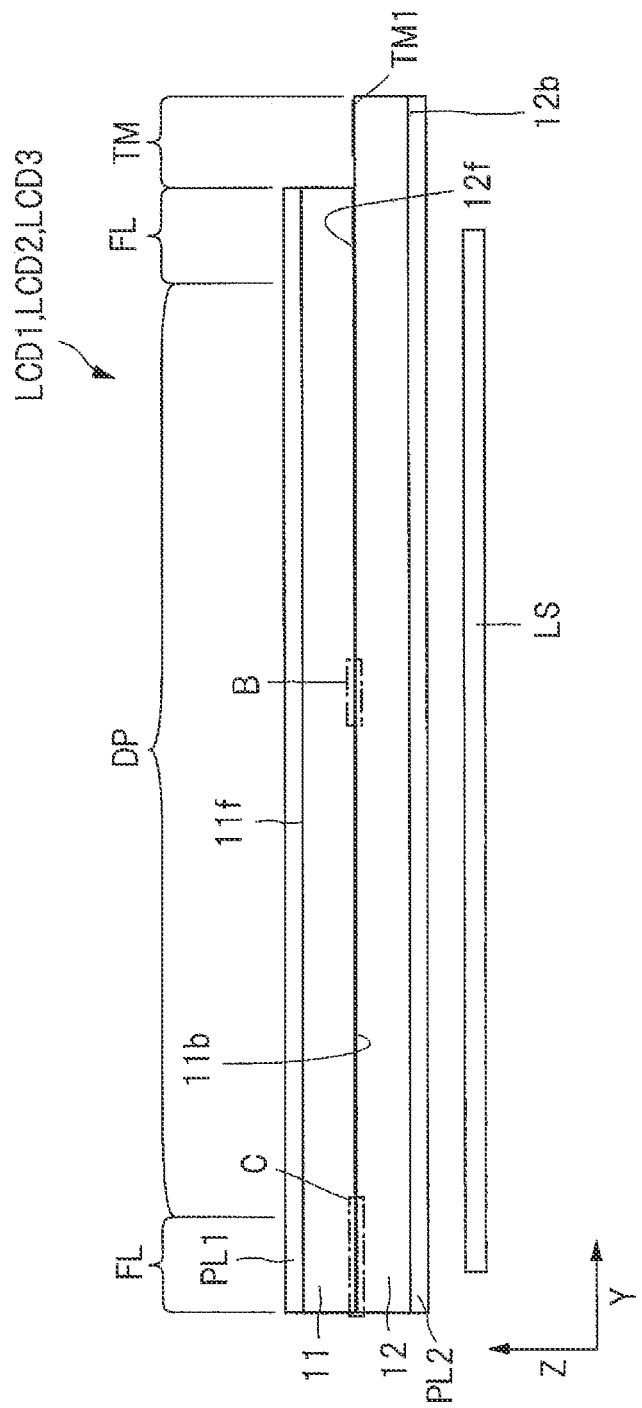
FIG. 2 is a sectional view along a line A-A illustrated in FIG. 1.
Figure 3:
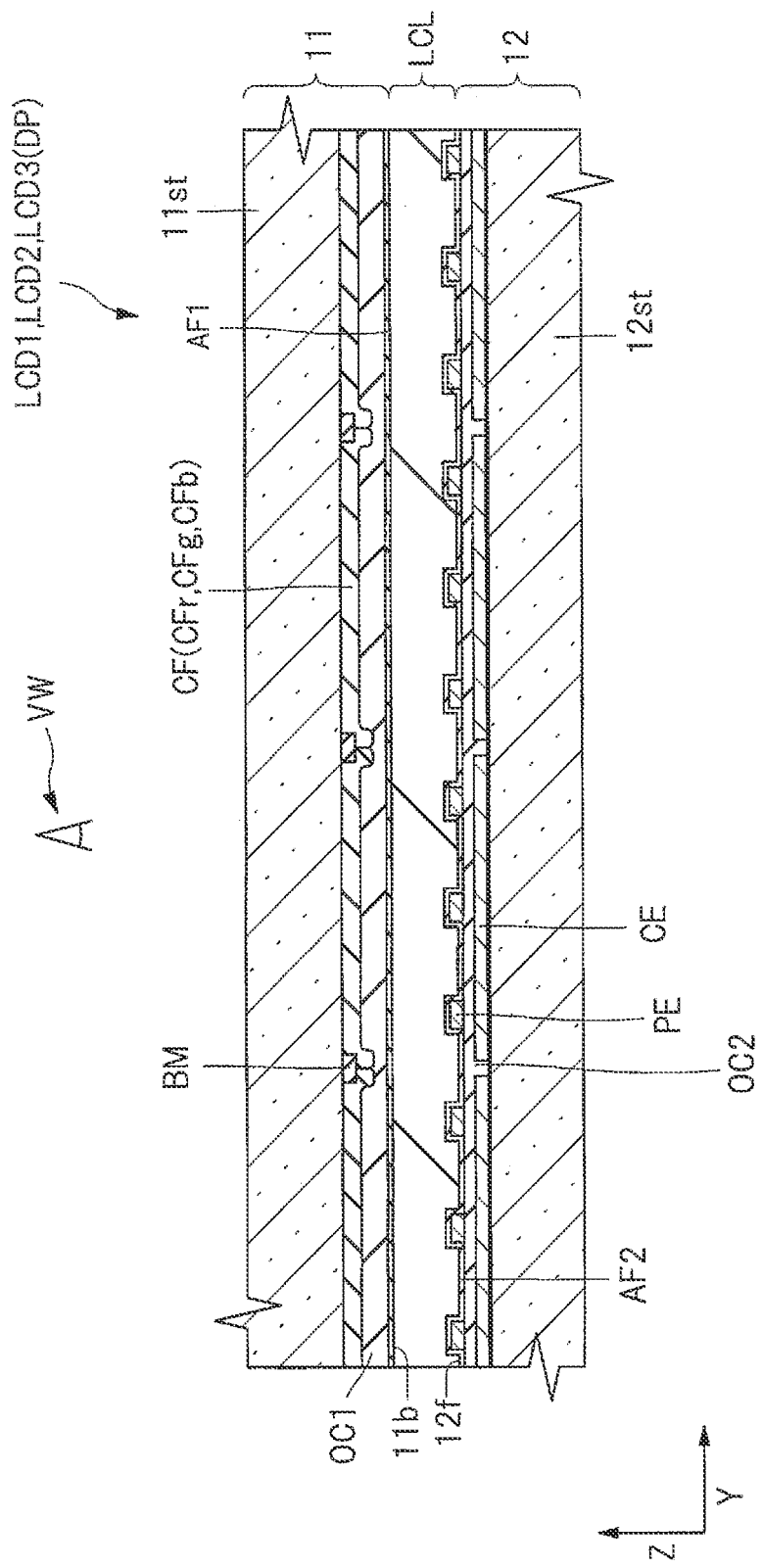
FIG. 3 is an enlarged sectional view of a portion B illustrated in FIG. 2.
Figure 4:
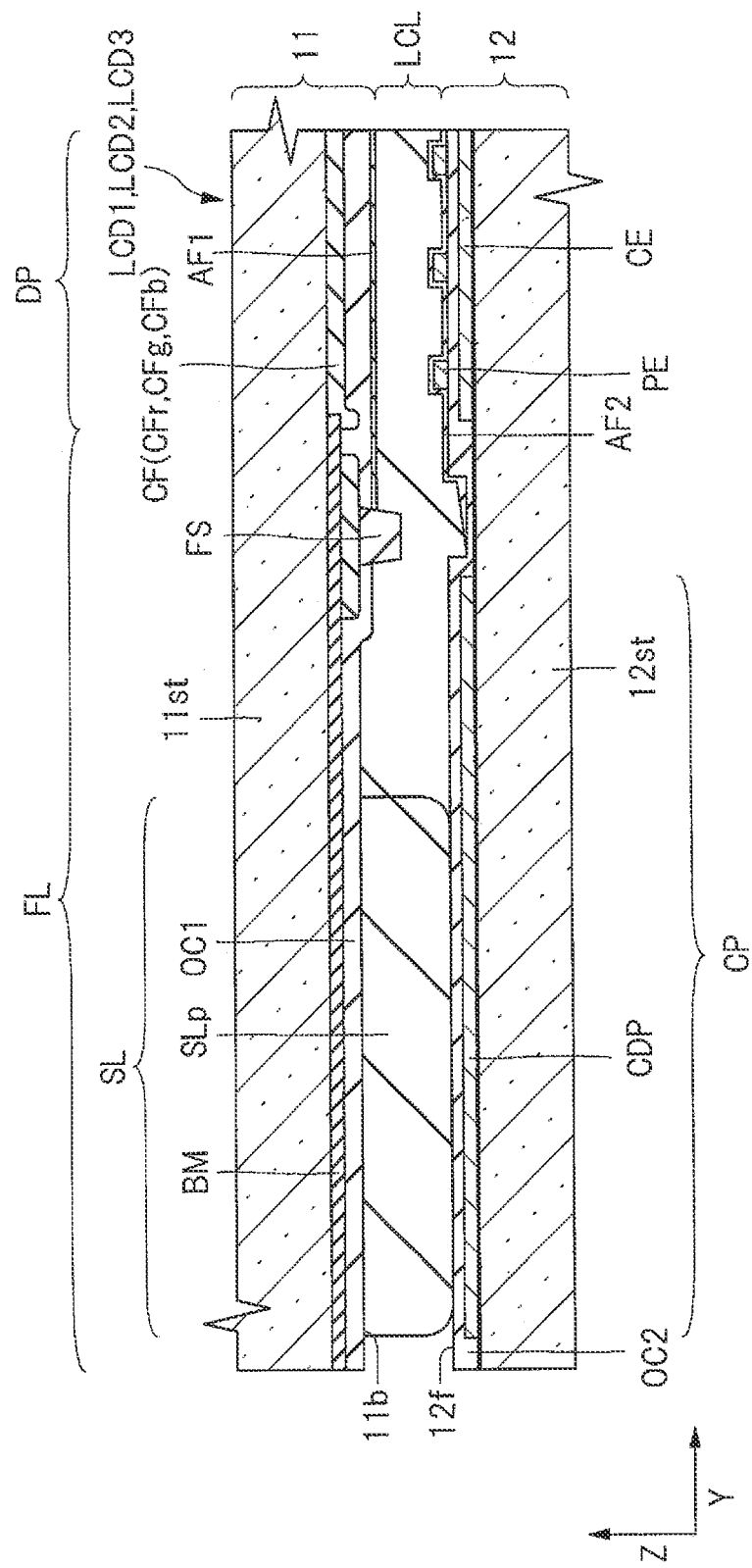
FIG. 4 is an enlarged sectional view of a portion C illustrated in FIG. 2.

A basic configuration of a liquid crystal display will be first described. FIG. 1 is a plan view illustrating an example of the liquid crystal display according to the present embodiment, and FIG. 2 is a sectional view along a line A-A illustrated in FIG. 1. FIG. 3 is an enlarged sectional view of a portion B illustrated in FIG. 2. FIG. 4 is an enlarged sectional view of a portion C illustrated in FIG. 2.

FIG. 1 is a plan view, where a display section DP is hatched and a contour of the display section DP is indicated by a two-dot and dash line to make a boundary between the display section DP and a frame section FL easy to see when seen in a plan view. In FIG. 1, a contour of a seal SL provided in the frame section FL surrounding a periphery of the display section DP is indicated by a dotted line. In FIG. 1, a contour of a circuit section CP provided between the display section DP and a peripheral edge of a substrate is indicated by a two-dot and dash line. FIG. 2 is a sectional view, where hatching is omitted for visibility.

As illustrated in FIG. 1, a display device LCD1 according to the present embodiment includes the display section DP serving as a display region where an image viewable from the outside is formed in response to an input signal. The display device LCD1 includes the frame section FL serving as a non-display region provided in a frame shape around the display section DP when seen in a plan view. The display device LCD1 includes a terminal section TM provided further outside the frame section FL when seen in a plan view. The terminal section TM includes a plurality of terminals TM1 for supplying an electric signal or a driving voltage to a plurality of elements for display formed in the display section DP and elements in the circuit sections CP provided in the frame section FL.

The frame section FL includes the circuit sections CP provided between the display section DP and the peripheral edge of the substrate. In an example illustrated in FIG. 1, among sides 11s1, 11s2, 11s3, and 11s4 of the substrate in the display device LDC1, the circuit sections CP are respectively provided between the side 11s3 and the display section DP and between the side 11s4 and the display section DP. In an example illustrated in FIG. 4, the circuit section CP is formed on the side of a substrate 12.

A conductor pattern constituting a driving circuit for forming an image in the display section DP is formed in the circuit section CP. The conductor pattern formed in the circuit section CP is electrically connected to the plurality of terminals TM1 formed in the terminal section TM.

As schematically illustrated in FIG. 1, the plurality of terminals TM1 are connected to a flexible wiring board FPC. The flexible wiring board FPC has a plurality of wirings formed in its resin film, for example, and can be freely deformed depending on a shape of an arrangement location. The plurality of terminals TM1 are electrically connected to a driving circuit DR1 and a control circuit CNT1 for image display via the flexible wiring board FPC. A semiconductor chip in which the driving circuit DR1 and the control circuit CNT1 are formed between the circuit section CP and the plurality of terminals TM1 may be provided on the substrate 12 using a Chip on glass (COG) system.

The display device LCD1 has a configuration in which a liquid crystal layer is formed between a pair of substrates oppositely arranged. More specifically, as illustrated in FIG. 2, the display device LCD1 includes the substrate 11 on the side of a display surface, the substrate 12 positioned on the opposite side of the substrate 11, and a liquid crystal layer LCL (see FIG. 3) arranged between the substrate 11 and the substrate 12.

The display device LCD1 includes the seal SL formed in the frame section FL around the display section DP where the liquid crystal layer LCL is formed when seen in a plan view, as illustrated in FIG. 1. The seal SL is formed to continuously surround a periphery of the display section DP. The substrates 11 and 12 illustrated in FIG. 2 are adhesively fixed to each other with the seal SL illustrated in FIGS. 1 and 4. The seal SL is thus provided around the display section DP, so that the liquid crystal layer LCL formed in the display section DP and a part of the frame section FL can be sealed.

The substrate 11 illustrated in FIG. 1 has the side 11s1 extending in an X-direction, the side 11s2 opposing the side 11s1, the side 11s3 extending in a Y-direction perpendicular to the X-direction, and the side 11s4 opposing the side 11s3 when seen in a plan view. Respective distances from the sides 11s1, 11s2, 11s3, and 11s4 of the substrate 11 to the display section DP are substantially the same.

The substrate 12 illustrated in FIG. 1 has a side 12s1 extending in the X-direction, a side 12s2 opposing the side 12s1, a side 12s3 extending in the Y-direction perpendicular to the X-direction, and a side 12s4 opposing the side 12s3 when seen in a plan view. In the example illustrated in FIG. 1, the terminal section TM is formed along the side 12s1 of the substrate 12. Therefore, a distance from the side 12s1 of the substrate 12 to the display section DP is longer than a distance from each of the other sides 12s2, 12s3, and 12s4 of the substrate 1 to the display section DP. Respective distances from the sides 12s2, 12s3, and 12s4 of the substrate 12 to the display section DP are substantially the same.

As illustrated in FIG. 2, a polarizing plate PL2 that polarizes light generated from a light source LS is provided on the side of a back surface 12b of the substrate 12 in the display device LCD1. The polarizing plate PL2 is adhesively fixed to the substrate 12 via an adhesive layer. On the other hand, a polarizing plate PL1 is provided on the side of a front surface 11f of the substrate 11. The polarizing plate PL1 is fixed to the substrate 11 via an adhesive layer.

While basic components for forming a display image are illustrated in FIG. 2, other components can be added to the components illustrated in FIG. 2 as modification examples. For example, a protective film or a cover member may be attached to a front surface of the polarizing plate PL1 as a protective layer for protecting the polarizing plate PL1 from a flaw or dirt. For example, the present invention can be applied to an example in which an optical film such as a phase difference plate is affixed to the polarizing plate PL1 and the polarizing plate PL2. Alternatively, a method for forming an optical film can be applied to each of the substrates 11 and 12. As a modification example of FIG. 1, a semiconductor chip in which a driving circuit for supplying a pixel voltage to pixel electrodes PE (see FIG. 3) may be mounted on a front surface 12f of the substrate 12, for example.

As illustrated in FIG. 3, the display device LCD1 includes the plurality of pixel electrodes PE arranged between the substrate 11 and the substrate 12 and a common electrode CE arranged between the substrate 11 and the substrate 12. The display device LCD1 according to the present embodiment is a display device in a horizontal electric field mode, as described above. Thus, the plurality of pixel electrodes PE and the common electrode CE are respectively formed in the substrate 12.

The substrate 12 illustrated in FIG. 3 includes a base material 12st composed of a glass substrate, and a circuit for image display is mainly formed in the base material 12st. The circuit for image display includes the driving circuit formed in the circuit section CP (see FIG. 1) and an active element such as a Thin-Film Transistor (TFT) formed in the display section DP. The base material 12st has the front surface 12f positioned on the side of the substrate 11 and the back surface 12b (see FIG. 2) positioned on the opposite side thereof. The active element such as the TFT and the plurality of pixel electrodes PE are formed in a matrix shape on the side of the front surface 12f of the substrate 12. A substrate on which the TFT is formed as the active element, e.g., the substrate 12, is referred to as a TFT substrate.

In an example illustrated in FIG. 3, the display device LCD1 in the horizontal electric field mode (specifically, a Fringe Field Switching (FFS) mode) is illustrated, as described above. Thus, the common electrode CE and the pixel electrodes PE are respectively formed on the side of the front surface 12f of the substrate 12. The common electrode CE is formed on the side of the front surface 12f of the base material 12st included in the substrate 12, and is covered with an insulating film OC2. The plurality of pixel electrodes PE are formed on a surface, on the side of the substrate 11, of the insulating film OC2 so as to oppose the common electrode CE via the insulating film OC2.

The substrate 12 has an oriented film AF2 covering the insulating film OC2 and the plurality of pixel electrodes PE on the front surface 12*f* serving as an interface contacting the liquid crystal layer LCL. An oriented film AF1, which will be described below, and the oriented film AF2 are resin films formed to align an initial orientation of a liquid crystal included in the liquid crystal layer LCL, and are composed of polyimide resin, for example.

The substrate 11 illustrated in FIG. 3 is a substrate in which a color filter CF forming a color display image is formed on a base material 11*st* composed of a glass substrate, and has the front surface 11*f* on the side of the display surface and a back surface 11*b* (see FIG. 2) positioned on the opposite side of the front surface 11*f*. When distinguished from the above-described TFT substrate, a substrate in which a color filter CF is formed, for example, the substrate 11 is referred to as a color filter (CF) substrate or an opposite substrate because it opposes the TFT substrate via a liquid crystal layer. As a modification example of FIG. 3, a configuration in which the color filter CF is provided in the TFT substrate may be adopted.

The substrate 11 has the color filter CF, configured by periodically arranging color filter pixels CFr, CFg, and CFb in three colors, i.e., red (R), green (G), and blue (B) on one surface of the base material 11*st* composed of the glass substrate, for example, formed therein. In a color display device, sub-pixels in three colors, i.e., red (R), green (G), and blue (B), for example, as one set, constitute one pixel (also referred to as one pixel). The plurality of color filter pixels CFr, CFg, and CFb in the substrate 11 are arranged at positions respectively opposing sub-pixels having the pixel electrodes PE formed in the substrate 12.

Light shielding films BM are respectively formed in boundaries among the color filter pixels CFr, CFg, and CFb in the colors. The light shielding film BM is referred to as a black matrix, and is composed of black resin, for example. The light shielding films BM are formed in a lattice shape when seen in a plan view. In other words, the substrate 11 has the color filter pixels CFr, CFg, and CFb in the colors formed among the light shielding films BM formed in a lattice shape.

In the present application, a region described as the display section DP or the display region is defined as a region inside the frame section FL. The frame section FL is a region covered with the light shielding films BM for blocking light irradiated from the light source LS illustrated in FIG. 2. While the light shielding films BM are also formed in the display section DP, in the display section DP, a plurality of openings are formed in the light shielding films BM, and the color filter CF is formed in the openings. Therefore, among the plurality of openings in which the color filter CF is formed, an end portion of the opening formed closest to the peripheral edge of the substrate 11 is defined as a boundary between the display section DP and the frame section FL. However, a slit for suppressing entrance of water may be formed in the light shielding film BM, as described below. The opening formed for the purpose of suppressing entrance of water is distinguished from the above-described opening in that the color filter CF is not formed.

The substrate 11 includes a resin film OC1 covering the color filter CF. The light shielding films BM are respectively formed at boundaries among the color filter pixels CFr, CFg, and CFb in the colors. Thus, an inner side surface of the color filter CF becomes an irregular surface. The resin film OC1 functions as a flattening film for flattening irregularities on the inner side surface of the color filter CF. Alternatively, the resin film OC1 functions as a protective film for preventing impurities from being diffused toward the liquid crystal layer from the color filter CF. A resin material for the resin film OC1 can be cured by containing a component, which is cured by applying energy, e.g., a thermosetting resin component or a light curing resin component. The resin film OC1 is preferably formed of an organic material such as resin from a viewpoint of flattening the irregularities on the inner side surface of the color filter CF.

The substrate 11 includes the oriented film AF1 covering the resin film OC1 on the back surface 11*b* serving as its interface contacting the liquid crystal layer LCL. This oriented film AF1 is a resin film formed to align an initial orientation of a liquid crystal included in the liquid crystal layer LCL, and is composed of polyimide resin, for example. In the example illustrated in FIG. 4, a member FS for suppressing expansion of the oriented film AF1 is provided on the side of a peripheral edge of the display section DP. The member FS functions as a damping member for suppressing wide covering of the frame section FL with the oriented film AF1 when the oriented film AF1 is formed on the back surface 11*b* of the substrate 11 in a process for manufacturing the display device LCD1. Therefore, the member FS is formed so as to project toward the back surface 11*b* of the substrate 11.

The liquid crystal layer LCL, which forms a display image by applying a display voltage between the pixel electrodes PE and the common electrode CE, is provided between the substrate 11 and the substrate 12. The liquid crystal layer LCL modulates light that passes therethrough depending on a state of an applied electric field.

As illustrated in FIG. 4, the seal SL arranged to surround the liquid crystal layer LCL is composed of a sealing material SLp. The liquid crystal layer LCL is sealed into a region surrounded by the sealing material SLp. That is, the sealing material SLp functions as a sealing material for preventing the liquid crystal layer LCL from leaking out. The sealing material SLp closely adheres to each of the back surface 11*b* of the substrate 11 and the front surface 12*f* of the substrate 12. The substrate 11 and the substrate 12 are thus adhesively fixed to each other via the sealing material SLp. That is, the sealing material SLp functions as an adhesive member for adhesively fixing the substrate 11 and the substrate 12.

The thickness of the liquid crystal layer LCL illustrated in FIGS. 3 and 4 is significantly smaller than the thicknesses of the substrates 11 and 12. For example, the thickness of the liquid crystal layer LCL is approximately 0.1% to 10% of the thicknesses of the substrates 11 and 12. In the example illustrated in FIGS. 3 and 4, the thickness of the liquid crystal layer LCL is approximately 4 μm, for example.

In the present embodiment, the frame section FL includes the circuit section CP provided between the display section DP and the peripheral edge of the substrate, as illustrated in FIGS. 1 and 4. A conductor pattern CDP is formed in the circuit section CP. The conductor pattern is a conductor patterned so as to constitute a circuit, and is formed of a single metal such as copper (Cu) or aluminum (Al) or its alloy, for example. When the circuit is thus formed by the conductor pattern CDP, an insulating film OC2 is preferably formed so as to cover the conductor pattern CDP from a viewpoint of suppressing damage of the conductor pattern CDP. At least an outermost surface of the insulating film OC2 is preferably formed of an organic film such as a resin film from a viewpoint of forming the insulating film OC2 so as to reliably cover the conductor pattern CDP. Alternatively, the insulating film OC2 may be a stacked film obtained by stacking an inorganic insulating film and an organic insulating film in this order from the base material 12st. Irregularities on the surface of the insulating film OC2 can be reduced and flattened by forming the organic insulating film so as to cover the inorganic insulating film.

A method for displaying a color image by the display device LCD1 illustrated in FIG. 3 is as follows, for example. More specifically, light emitted from the light source LS is filtered by a polarizing plate PL2, and light passing through the polarizing plate PL2 is incident on the liquid crystal layer LCL. The light, which has been incident on the liquid crystal layer LCL, is propagated in a thickness direction of the liquid crystal layer LCL (i.e., a direction toward the substrate 11 from the substrate 12) by changing a polarization state depending on refractive index anisotropy (i.e., birefringence) of a liquid crystal, and is emitted from the substrate 11. At this time, liquid crystal orientation is controlled by an electric field formed by applying a voltage to the pixel electrodes PE and the common electrode CE. The liquid crystal layer LCL functions as an optical shutter. More specifically, in the liquid crystal layer LCL, light transmittance can be controlled for each sub-pixel. The light, which has reached the substrate 11, is subjected to color filtering processing (i.e., processing for absorbing light having a wavelength other than a predetermined wavelength) in the color filter CF formed in the substrate 11, and is emitted from the front surface 11f. The light emitted from the front surface 11f reaches a viewer VW via the polarizing plate PL1.

<Details-1 of Frame Section>

Figure 5:
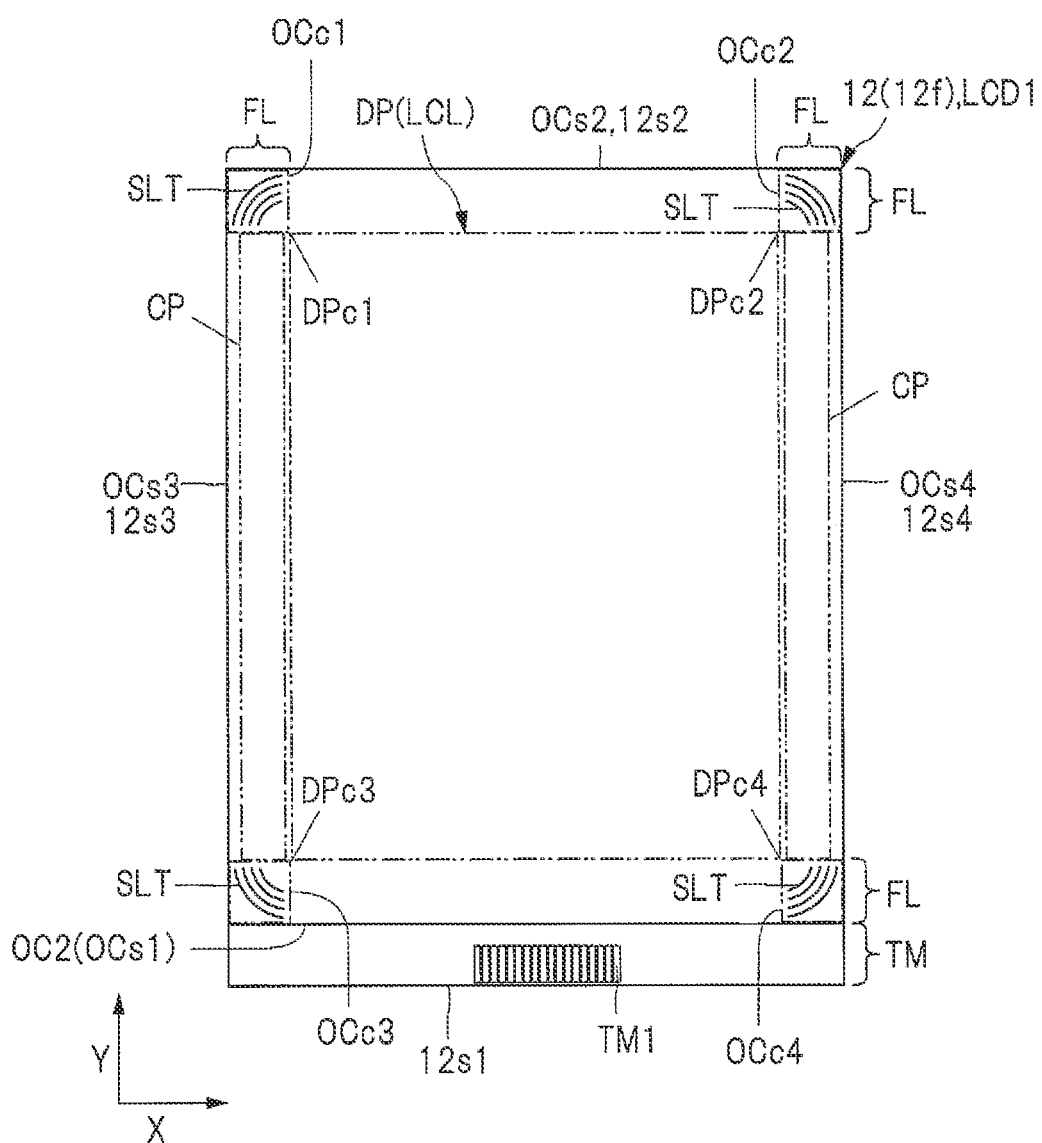
FIG. 5 is a plan view on the side of a front surface of a TFT substrate illustrated in FIGS. 3 and 4.

Details of the frame section FL will be described below. In this section, a technique for suppressing entrance of water from the periphery of an organic film formed on the side of the substrate 12 out of the substrates 11 and 12 illustrated in FIG. 4 will be described. FIG. 5 is a plan view on the side of a front surface of the TFT substrate illustrated in FIGS. 3 and 4. FIG. 5 illustrates a state where the substrate 11 and the seal SL illustrated in FIG. 4 are removed so as to make a structure on the side of the substrate 12 illustrated in FIG. 1 easy to see. In FIG. 5, the display section DP, the circuit sections CP, and each of four corner parts OCc1, OCc2, OCc3, and OCc4 of the insulating film OC2 are respectively surrounded by two-dot and dash lines.

In recent years, a technique for reducing the width of the frame section FL in the display device to increase a ratio of the effective display area of the display device has been required form a viewpoint of improving designability or a viewpoint of lighter weight. When the width of the frame section FL is reduced, however, a distance from an outer edge of the substrate to the display section DP is reduced. If water enters the substrate from the outer edge of the substrate, therefore, the water easily reaches the display section DP. Particularly if the organic film formed on the side of opposing surfaces of the pair of substrates extends to the outer edge of the substrate, water easily enters the display section DP through an adhesive interface between the organic film and the substrate or the inside of the organic film. When water enters the display section DP, a constituent material of the liquid crystal layer LCL formed in the display section DP changes in quality, so that a display functional characteristic may change. The insulating film OC2 serving as the organic film formed in the substrate 12 extends toward the peripheral edge of the substrate 12, as illustrated in FIG. 5, for example.

A method for suppressing entrance of water into the display section DP includes a method for forming a slit serving as an opening, which penetrates an organic film, so as to surround a periphery of the display section DP. When the slit is formed to penetrate the organic film in a thickness direction, a water entrance path is blocked hallway to thereby inhibit entrance of water. Even if the width of the frame section FL is reduced, therefore, a time elapsed until water enters the display section DP can be extended.

If the circuit section CP is provided between the display section DP and the peripheral edge of the substrate, as illustrated in FIG. 1, a position where a slit is formed becomes a problem. More specifically, when a slit is formed in the insulating film OC2 serving as an organic film in the frame section FL illustrated in FIG. 4, a part of the conductor pattern CDP is exposed in the slit. In a portion exposed from the insulating film OC2, the conductor pattern CDP is not protected. Therefore, the entire conductor pattern CDP is preferably covered with the insulating film OC2 without a slit being formed in the circuit section CP from a viewpoint of reliably protecting the conductor pattern CDP.

On the other hand, for the entire conductor pattern CDP to be covered with the insulating film OC2, a slit needs to be formed in a location other than the circuit section CP. If a formation region of the slit is provided between the circuit section CP and the peripheral edge of the substrate, however, the width of the frame section FL increases.

The inventors of the present application have further examined a phenomenon where a display functional characteristic changes because water enters the display section DP from the outer edge of the substrate. According to the examination by the inventors of the present application, the change in the display functional characteristic due to the entrance of water is first actualized in corner parts of the display section DP. An example of the change in the display functional characteristic includes a phenomenon where nonuniformity in display is visualized. However, the nonuniformity in display is first visualized in corner parts of an effective display region constituting a square.

Thus, the change in the display functional characteristic is first actualized in the corner parts of the display section DP from the following reason. That is, distances of each of the corner parts of the display section DP to two of the four sides of the substrate are short. Thus, an amount of water entering the corner part is relatively larger than that entering the side positioned between the adjacent corner parts. In the example illustrated in FIG. 5, for example, the corner part DPc1 among the four corner parts of the display section DP is required to consider entrance of water from the side 12s3 of the substrate 12 in addition to entrance of water from the side 12s2 of the substrate 12. The corner part DPc2 is required to consider entrance of water from the side 12s4 of the substrate 12 in addition to entrance of water from the side 12s2 of the substrate 12. Respective distances of the corner parts DPc3 and DPc4 to the side 12s1 of the substrate 12 are long, so that respective amounts of water entering the corner parts DPc3 and DPc4 are smaller than those entering the corner parts DPc1 and DPc2. However, the relatively larger amount of water enters the corner parts DPc3 and DPc4 than that entering the side between the corner parts.

A period during which the display quality of the display device can be maintained can be extended by reducing an amount of water entering the display section DP toward the corner part of the display section DP if the fact that the change in the display functional characteristic is first actualized in the corner part of the display section DP is paid attention to, as described above. In other words, the life of a product can be extended.

A slit need not be formed so as to continuously surround a periphery of the display section DP if the fact that the amount of water entering the corner part of the display section DP is reduced is paid attention to. For example, a slit SLT may be selectively formed in the corner parts of the insulating film OC2 serving as an organic film covering the front surface 12$f$ of the substrate 12, as illustrated in FIG. 5.

In an example illustrated in FIG. 5, the slit SLT is formed in each of the corner parts OCc1, OCc2, OCc3, and OCc4 of the insulating film OC2. The slits SLT are not connected to, but independent of one another.

The corner parts OCc1, OCc2, OCc3, and OCc4 of the insulating film OC2 are defined as follows. More specifically, the corner part OCc1 is a region surrounded by extensions of a contour line of the display section DP, the side OCs2 of the insulating film OC2, and the side OCc3 of the insulating film OC2. The corner part OCc2 is a region surrounded by extensions of the contour line of the display section DP, the side OCs2 of the insulating film OC2, and the side OCS4 of the insulating film OC2. The corner part OCc3 is a region surrounded by extensions of the contour line of the display section DP, the side OCs1 of a termination portion of the organic film, and the side OCs3 of the insulating film OC2. The corner part OCc4 is a region surrounded by extensions of the contour line of the display section DP, the side OCs1 of the termination portion of the organic film, and the side OCs4 of the insulating film OC2.

In the example illustrated in FIG. 5, the insulating film OC2 serving as an organic film covering the front surface 12$f$ of the substrate 12 has the side OCs1 extending in the X-direction, the side OCs2 opposing the side OCs1, the side OCs3 extending in the Y-direction perpendicular to the X-direction, and the side OCs4 opposing the side OCs3 when seen in a plan view. In the example illustrated in FIG. 5, the terminal section TM is formed along the side OCs1 of the insulating film OC2. Thus, the side OCs1 of the insulating film OC2 exists between the side 12$s$1 of the substrate 12 and the display section DP. On the other hand, the sides OCs2, OCs3, and OCS4 of the insulating film OC2 respectively match the sides 12$s$2, 12$s$3, and 12$s$4 of the substrate 12 when seen in a plan view.

As illustrated in FIG. 5, the slit SLT is formed in each of the corner parts OCc1, OCc2, OCc3, and OCc4 of the insulating film OC2, so that water entering the display section DP toward the corner part of the display section DP can be reduced. The plurality of slits SLT are separated from one another, so that the slit SLT is not formed in the circuit section CP. Thus, the entire conductor pattern CDP (see FIG. 4) formed in the circuit section CP is covered with the insulating film OC2 serving as a protective film. Therefore, the conductor pattern CDP formed in the circuit section CP can be reliably protected.

In the present embodiment, the slit SLT is not formed between the circuit section CP and the side 12$s$3 of the substrate 12 and between the circuit section CP and the side 12$s$4 of the substrate 12. In other words, the slit SLT is not formed between the corner parts OCc1 and OCc3 of the insulating film OC2 and between the corner parts OCc2 and OCc4 of the insulating film OC2. Therefore, a space required to form the circuit section CP has only to be ensured as a distance between the peripheral edge of the substrate 12 and the display region, so that the width of the frame section FL can be reduced.

Figure 6:
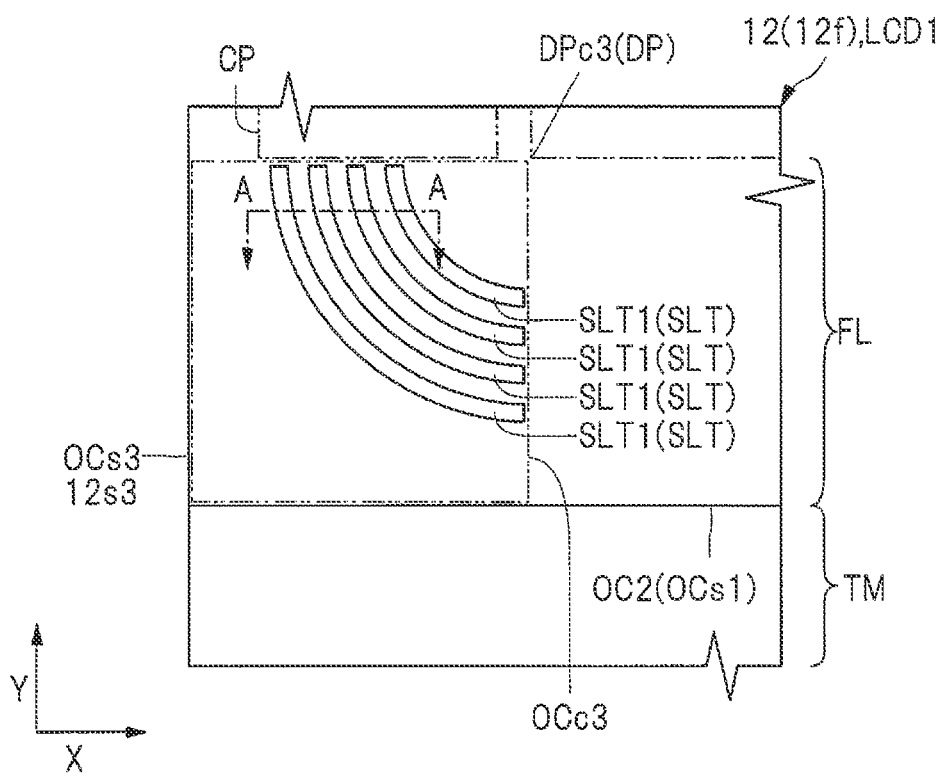
FIG. 6 is an enlarged plan view illustrating one of the four corner parts of an organic film illustrated in FIG. 5 in an enlarged manner.
Figure 7:
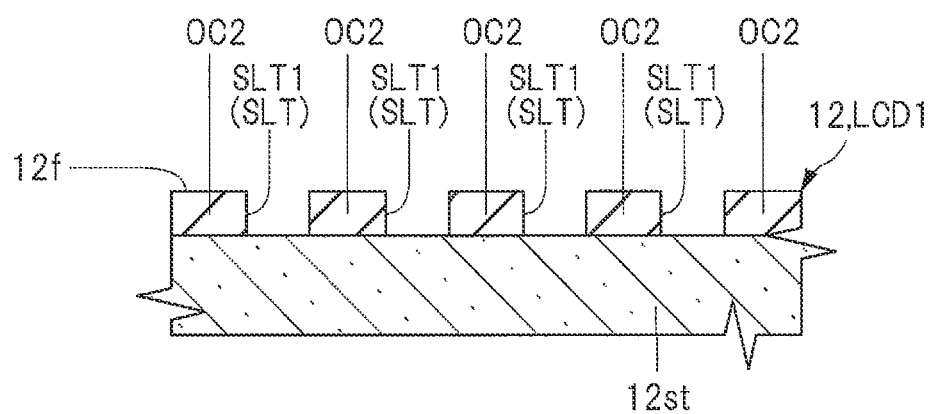
FIG. 7 is an enlarged sectional view taken along a line A-A illustrated in FIG. 6.

Details of the slit SLT illustrated in FIG. 5 formed for the purpose of suppressing entrance of water will be described below. FIG. 6 is an enlarged plan view illustrating one of the four corner parts of an organic film illustrated in FIG. 5 in an enlarged manner. FIG. 7 is an enlarged sectional view taken along a line A-A illustrated in FIG. 6.

FIG. 6 illustrates the corner part OCc3 and its vicinities as a representative example of the corner parts OCc1, OCc2, OCc3, and OCc4 of the insulating film OC2 illustrated in FIG. 5 in an enlarged manner. While illustration in an enlarged plan view of the other corner parts OCc1, OCc2, and OCc4 is omitted, a similar slit SLT to that in the corner part OCc3 is formed.

In an example illustrated in FIG. 6, a plurality of slits SLT1 serving as openings formed so as to remove a part of the insulating film OC2 are formed in the corner part OCc3 of the insulating film OC2. Each of the plurality of slits SLT1 is formed to penetrate the insulating film OC2 in a thickness direction, as illustrated in FIG. 7. Thus, the slits SLT1, which penetrate the insulating film OC2 serving as an organic film in the thickness direction, are formed, to divide an entrance path of water. Therefore, even if water enters the display section DP from a peripheral edge of the insulating film OC2, the water does not reach the corner part DPc3 of the display section DP unless the water bypasses the slits SLT1. Therefore, a time elapsed until the water reaches the display section DP can be extended.

As described above, the insulating film OC2 may be a stacked film obtained by stacking an inorganic insulating film and an organic insulating film in this order from the base material 12$st$. The above-described water enters the display section DP via an adhesive interface between the organic insulating film and the inorganic insulating film, or via the inside of the organic insulating film. If the insulating film OC2 is a stacked film of the inorganic insulating film and the organic insulating film, therefore, the slits SLT1 may be formed so as to penetrate the organic insulating film of the insulating film OC2 in the thickness direction.

In the example illustrated in FIG. 6, the four slits SLT1 are arranged toward the corner part DPc3 of the display section DP from a corner serving as an intersection between the sides OCs1 and OCs3 of the insulating film OC2. In other words, the plurality of slits SLT1 are formed toward the peripheral edge of the display section DP from the peripheral edge of the insulating film OC2 in the corner part OCc3 of the insulating film OC2.

However, the number of the slits SLT1 provided in the one corner part OCc3 is not limited to four, but there are various modification examples. For example, the effect of dividing the entrance path of water by the slits SLT1 is obtained if at least one of the slits SLT1 is arranged between a corner at the peripheral edge of the insulating film OC2 and the corner part DPc3 of the display section DP. The plurality of slits SLT1 are preferably arranged between the corner at the peripheral edge of the insulating film OC2 and the corner part DPc3 of the display section DP, as illustrated in FIG. 6, from a viewpoint of more reliably suppressing the entrance of water.

If the plurality of slits SLT1 are formed, the opening width of each of the slits SLT1 can be set to approximately 10 µm to 100 µm, for example. Separation distances among the plurality of slits SLT1 can be set to approximately 30 µm to 100 µm, for example, although they can be determined depending on the number of the slits SLT1 to be arranged and a space of the corner part OCc3. In this case, the entrance of water can be effectively suppressed by determining the number of the slits SLT1 and the opening width of each of the slits SLT1 such that the sum of the opening widths of the plurality of slits SLT1 is approximately 140 μm to 300 μm.

In the example illustrated in FIG. 6, the plurality of slits SLT1 are formed to draw a circular arc around the corner part DPc3 of the display section DP. When each of the plurality of slits SLT1 is thus formed to draw a circular arc, a bypass distance during entrance of water can be made longer than when the slits SLT1 are linearly formed.

Figure 8:
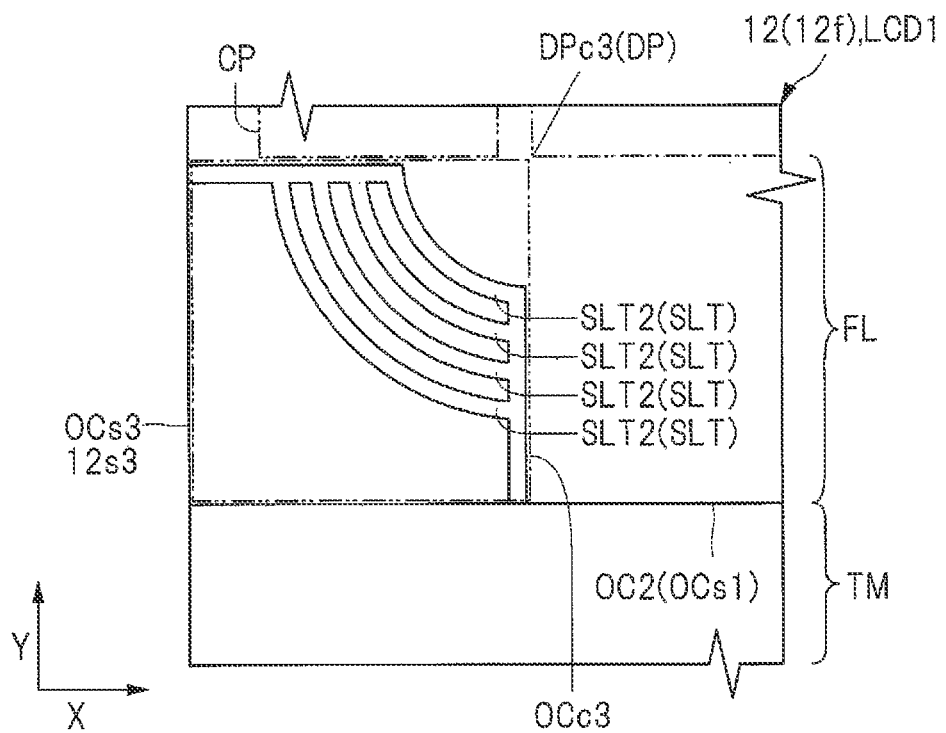
FIG. 8 is an enlarged plan view respectively illustrating a modification example of a slit illustrated in FIG. 6.
Figure 9:
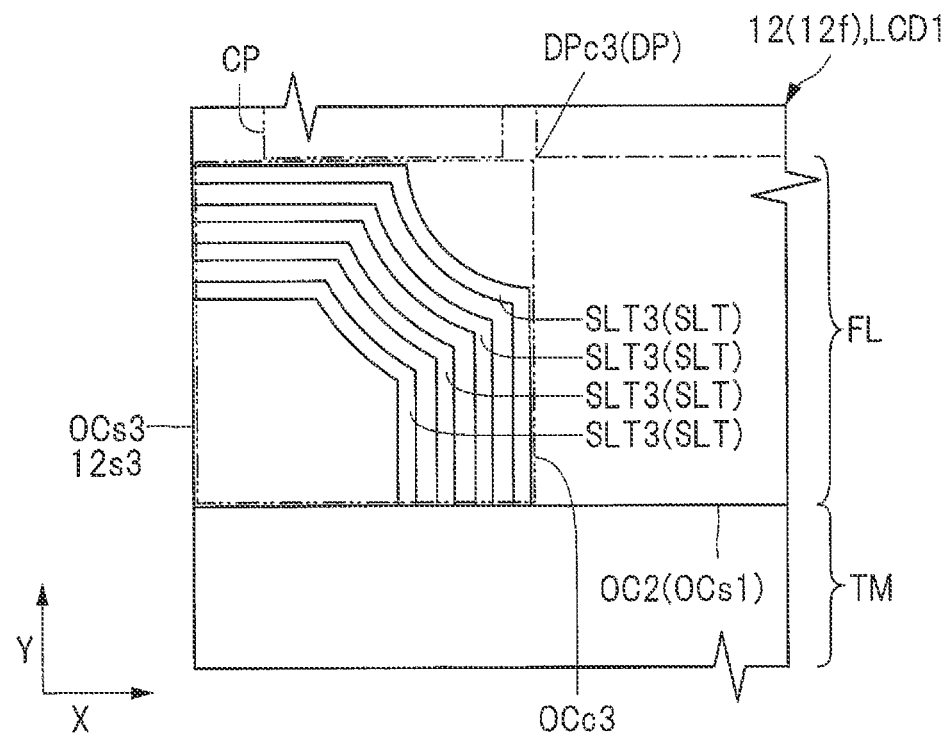
FIG. 9 is an enlarged plan view respectively illustrating another modification example of a slit illustrated in FIG. 6.

As a modification example of the slits SLT1 illustrated in FIG. 6, the following example will be described below. FIGS. 8 and 9 are enlarged plan views respectively illustrating the modification examples of the slits SLT1 illustrated in FIG. 6. A plurality of slits SLT2 illustrated in FIG. 8 and a plurality of slits SLT3 illustrated in FIG. 9 differ from the plurality of slits SLT1 illustrated in FIG. 6 in that both ends of an opening formed in the insulating film OC2 respectively communicate with edges of the insulating film OC2.

In the modification example illustrated in FIG. 8, each of the plurality of slits SLT2 is connected to a pullout portion extending to the edge of the insulating film OC2. The pullout portion is an opening formed so as to penetrate the insulating film OC2 serving as an organic film in the thickness direction, like the slits SLT1 described with reference to FIG. 7. Therefore, both ends of each of the slits SLT2 respectively communicate with the edges of the insulating film OC2.

In the modification example illustrated in FIG. 9, each of the plurality of slits SLT3 has a pullout portion extending to the edge of the insulating film OC2. The pullout portion is an opening formed so as to penetrate the insulating film OC2 serving as an organic film in the thickness direction, like the slits SLT1 described with reference to FIG. 7. Therefore, both ends of each of the plurality of slits SLT3 respectively communicate with the edges of the insulating film OC2.

If both ends of the opening respectively communicate with the edges of the insulating film OC2, like the slits SLT2 and SLT3, a path where water, having entered the corner part OCc3 of the insulating film OC2, bypasses can be blocked. Therefore, water having entered a region surrounded by the slits SLT2 or the slits SLT3 and the edges of the insulating film OC2, can be prevented from reaching the display section DP.

While an example in which the slit SLT is formed in only each of the four corner parts OCc1, OCc2, OCc3, and OCc4 of the insulating film OC2 is illustrated in FIG. 5, various modification examples can be applied unless the circuit section CP and the slit SLT do not overlap each other in the thickness direction. In the example illustrated in FIG. 5, for example, the circuit section CP is not formed in a region (i.e., a side) between the corner parts OCc1 and OCc2 of the insulating film OC2. Therefore, the slit SLT formed in the corner part OCc1 and the slit SLT formed in the corner part OCc2 may communicate with each other. In this case, water entering the side OCs2 of the insulating film OC2 can be prevented from reaching the display section DP.

If the wirings for connecting the terminals TM1 and the circuit sections CP need to be respectively formed in the corner parts OCc3 and OCc4, arranged on the side of the terminal section TM, among the four corner parts OCc1, OCc2, OCc3, and OCc4 of the insulating film OC2, opening widths of the slits SLT formed in the corner parts OCc3 and OCc4 may be smaller than opening widths of the slits SLT formed in the corner parts OCc1 and OCc2. Alternatively, there is also a modification example in which if an arrangement space of the slit SLT is difficult to be ensured in the corner parts OCc3 and OCc4, the slit SLT is not arranged in the corner parts OCc3 and OCc4 among the four corner parts OCc1, OCc2, OCc3, and OCc4 of the insulating film OC2.

<Details-2 of Frame Section>

Figure 10:
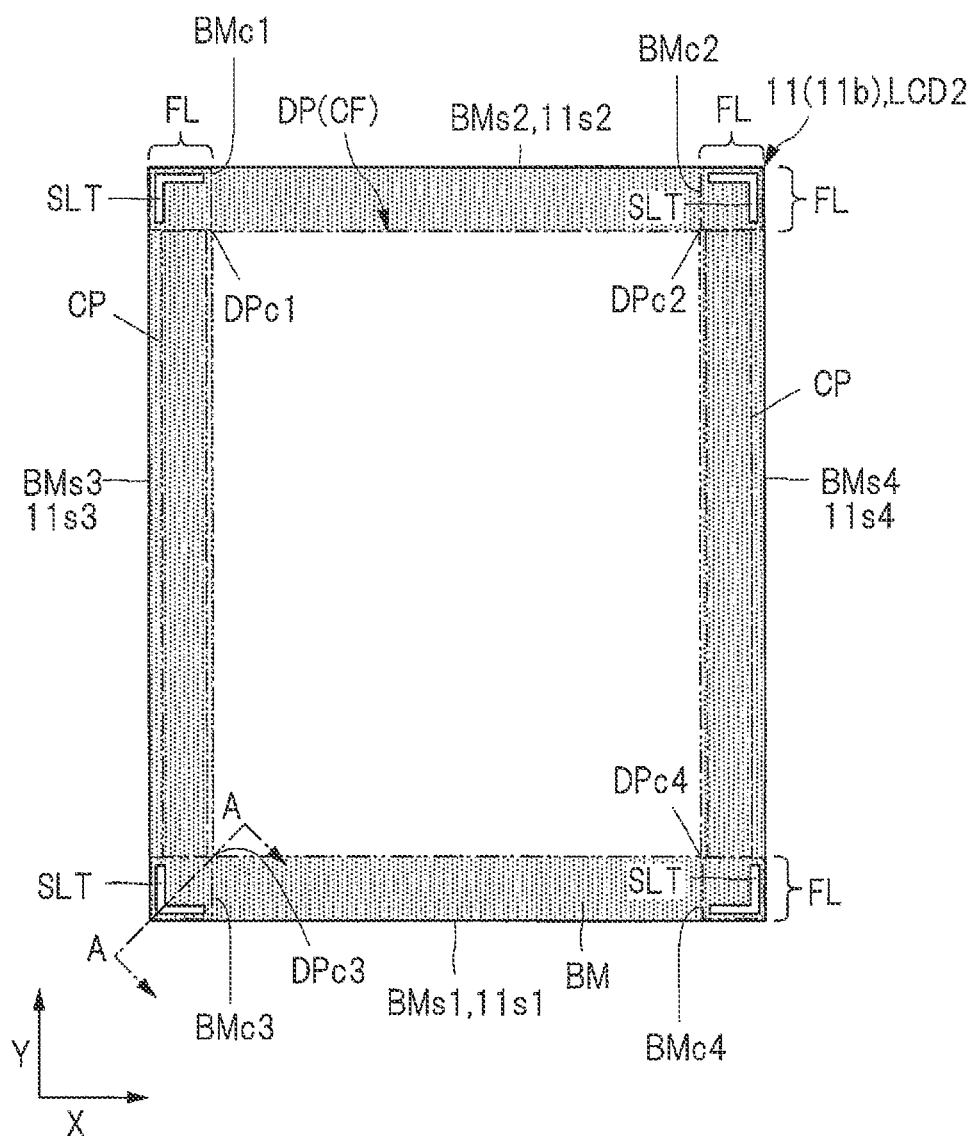
FIG. 10 is a plan view on the side of a back surface of a CF substrate illustrated in FIGS. 3 and 4.
Figure 11:
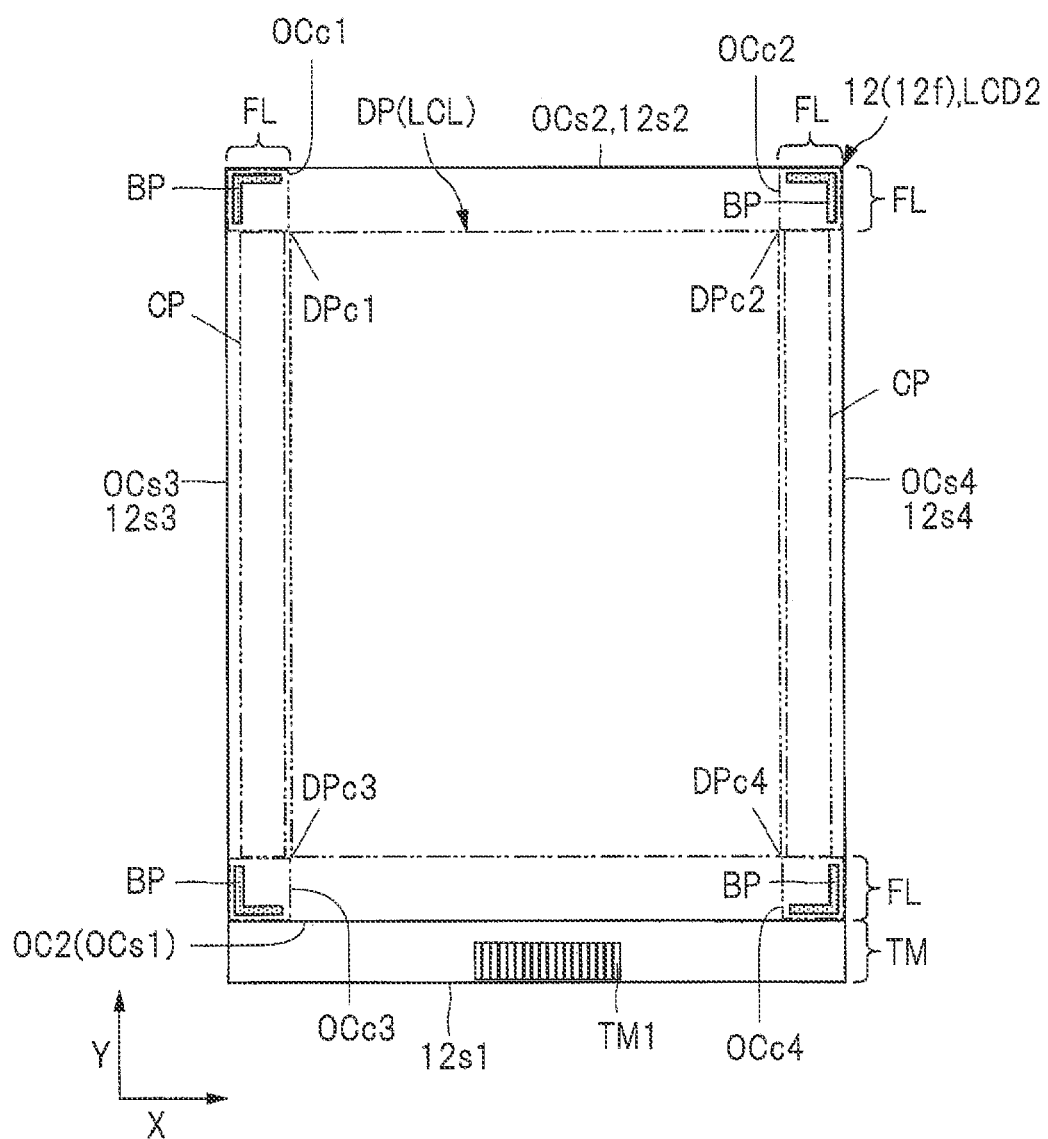
FIG. 11 is a plan view on the side of a front surface of a substrate serving as a modification example of a TFT substrate illustrated in FIG. 5.
Figure 12:
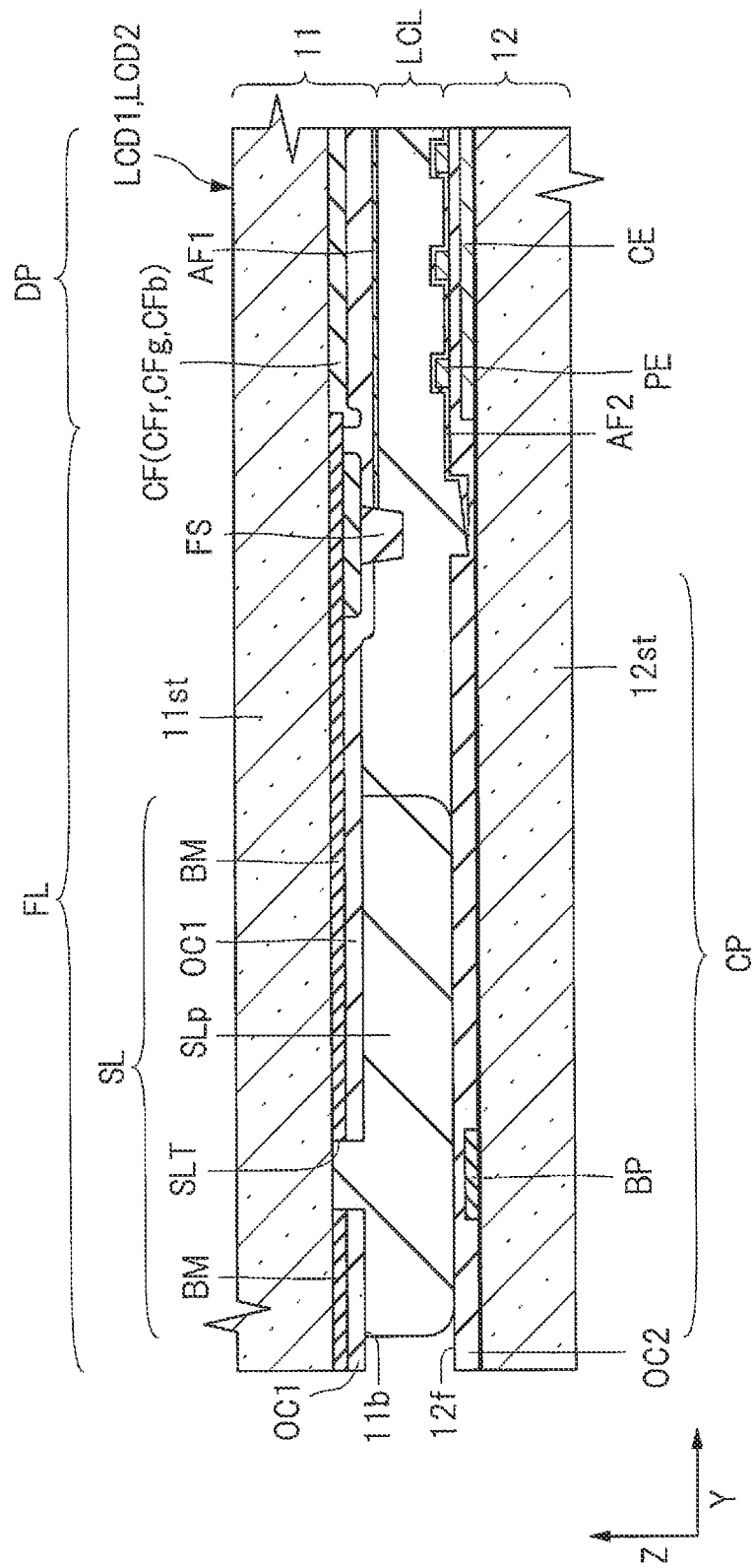
FIG. 12 is an enlarged sectional view along a line A-A illustrated in FIG. 10.

As an embodiment other than the display device LCD1 described with reference to FIGS. 5 to 9, a technique for suppressing entrance of water from the periphery of an organic film formed on the side of the substrate 11 out of the substrates 11 and 12 illustrated in FIG. 4 will be described below. FIG. 10 is a plan view on the side of a back surface of the CF substrate illustrated in FIGS. 3 and 4. FIG. 11 is a plan view on the side of a front surface of a substrate serving as a modification example of the TFT substrate illustrated in FIG. 5. FIG. 12 is an enlarged sectional view along a line A-A illustrated in FIG. 10. While a resin film OC1 covering a light shielding film BM is formed, as illustrated in FIGS. 3 and 4, on a back surface 11b of the substrate 11, FIG. 10 illustrates a state where the resin film OC1 is removed so as to clarify a positional relationship of slits SLT formed in the light shielding film BM.

As described above, the light shielding film BM and the resin film OC1 covering the light shielding film BM illustrated in FIGS. 3 and 4 are organic films each composed of an organic material. The organic film is more easily processed than an inorganic film. The organic film can be formed by a method for applying a liquid-like or paste-like material and then curing the applied material, so that the organic film more easily flattens a film formation surface than the inorganic film.

If the light shielding film BM and the resin film OC1 each serving as an organic film extend toward a peripheral edge of the substrate 11, as illustrated in FIG. 4, however, water easily enters the display section DP via an adhesive interface between the organic film and the substrate or the inside of the organic film. As described in the above-described section <Details-1 of Frame Section>, when water enters the display section DP, a constituent material of the liquid crystal layer LCL formed in the display section DP changes in quality, so that a display functional characteristic may change.

If the slit SLT is formed in the light shielding film BM serving as an organic film as a method for suppressing entrance of water into the display section DP, a light shielding member for preventing light from leaking out needs to be provided at a position where the slit SLT is formed. The light shielding film BM is a member for blocking light irradiated from the light source LS illustrated in FIG. 2. Thus, if the slit SLT is formed in the light shielding film BM, a light shielding member serving as a light shielding pattern corresponding to a shape of the slit SLT needs to be formed at a position overlapping the slit SLT in a thickness direction. If the slit SLT is formed in the substrate 11, therefore, a method for forming the light shielding member in the substrate 12 opposing the substrate 11 can be considered.

If a conductor pattern CDP (see FIG. 4) constituting the circuit section CP is formed in the substrate 12, as described above, however, the light shielding member needs to be formed so as to avoid the conductor pattern CDP. Thus, a slit SLT needs to be formed in a location other than a circuit section CP; however, if a slit formation region is provided between the circuit section CP and a peripheral edge of the substrate, the width of a frame section FL increases.

Therefore, the inventors of the present application have applied the technique described in the above-described section <Details-1 of Frame Section> to find out a technique for reducing the width of the frame section FL and suppressing entrance of water in the substrate 11. More specifically, when an amount of water entering a corner part of the display section DP is reduced, as described above, a period elapsed until a display functional characteristic changes can be lengthened. Therefore, a slit SLT need not be formed to continuously surround a periphery of the display section DP. As illustrated in FIG. 10, for example, the slit SLT may be selectively formed in a corner part of the light shielding film BM serving as an organic film formed on the side of the back surface 11b of the substrate 11.

In an example illustrated in FIG. 10, the slit SLT is formed in each of corner parts BMc1, BMc2, BMc3, and BMc4 of the light shielding film BM. The slits SLT are not connected to, but independent of one another. Each of the plurality of slits SLT is an opening formed so as to penetrate the light shielding film BM in the thickness direction, as illustrated in FIG. 12. The slit SLT may be formed so as to penetrate the resin film OC1. However, the slit SLT may be provided only in the light shielding film BM, and the slit SLT in the light shielding film BM may be covered with the resin film OC. As illustrated in FIG. 11, the light shielding member BP serving as a light shielding pattern corresponding to a shape of the slit SLT illustrated in FIG. 10 is formed at a position opposing the slit SLT.

As illustrated in FIG. 12, the light shielding member BP is formed at a position overlapping the slit SLT in the thickness direction. The light shielding member BP is formed in a shape similar to an opening shape of the slit SLT, and the area of the light shielding member BP is larger than the opening area of the slit SLT. Thus, light irradiated from the light source LS illustrated in FIG. 2 is blocked by the light shielding member BP, so that leakage of light out of the slit SLT formed in the light shielding film BM can be suppressed. While the light shielding member BP is the same material as a metal forming a wiring on the TFT substrate, and is formed integrally with a part of the wiring or apart from the wiring, the light shielding member BP may be an organic film containing a black pigment or a material different from the metal forming the wiring, e.g., chromium (Cr) or a chromium oxide.

The corner parts BMc1, BMc2, BMc3, and BMc4 of the light shielding film BM illustrated in FIG. 10 are defined as follows. More specifically, the corner part BMc1 is a region surrounded by extensions of a contour line of the display section DP, the side BMs2 of the light shielding film BM, and the side BMs3 of the light shielding film BM. The corner part BMc2 is a region surrounded by extensions of the contour line of the display section DP, the side BMs2 of the light shielding film BM, and the side BMs4 of the light shielding film BM. The corner part BMc3 is a region surrounded by extensions of the contour line of the display section DP, the side BMs1 of the light shielding film BM, and the side BMs3 of the light shielding film BM. The corner part BMc4 is a region surrounded by extensions of the contour line of the display section DP, the side BMs1 of the light shielding film BM, and the side BMs4 of the light shielding film BM.

In the example illustrated in FIG. 10, the light shielding film BM serving as an organic film covering the front surface 12f of the substrate 12 has a side BMs1 extending in an X-direction, a side BMs2 opposing the side BMs1, a side BMs3 extending in a Y-direction perpendicular to the X-direction, and a side BMs4 opposing the side BMs3 when seen in a plan view. In the example illustrated in FIG. 10, the terminal section TM (see FIG. 11) is not formed in the substrate 11. Therefore, the sides BMs1, BMs2, BMs3, and BMs4 of the light shielding film BM respectively match the sides 11s1, 11s2, 11s3, and 11s4 of the substrate 11 when seen in a plan view.

As illustrated in FIG. 10, when slits SLT are respectively formed in the corner parts BMc1, BMc2, BMc3, and BMc4 of the light shielding film BM, water entering the display section DP toward the corner part of the display section DP can be reduced. The plurality of slits SLT are separated from one another, so that the light shielding member BP formed so as to correspond to the slit SLT (see FIG. 10), as illustrated in FIG. 11, is not formed in the circuit section CP. The light shielding member BP is not formed between the circuit section CP and the sides 12s3 of the substrate 12, and between the circuit section CP and the side 12s4 of the substrate 12. In other words, the slit SLT is not formed between the corner parts BMc1 and BMc3 and between the corner parts BMc2 and BMc4 of the light shielding film BM illustrated in FIG. 10. Therefore, the width of the frame section FL can be reduced.

Figure 13:
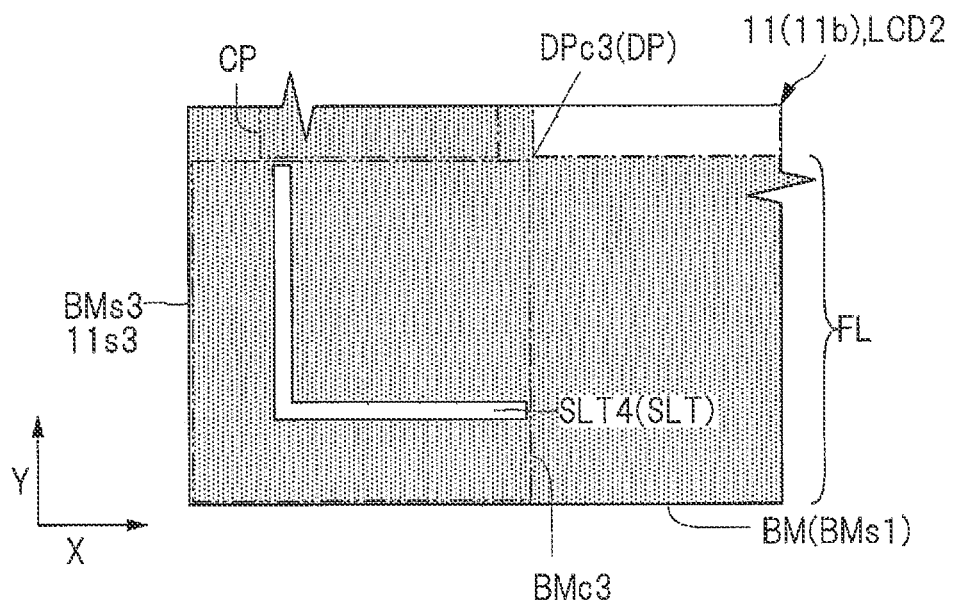
FIG. 13 is an enlarged plan view illustrating one of the four corner parts of a light shielding film illustrated in FIG. 10 in an enlarged manner.
Figure 14:
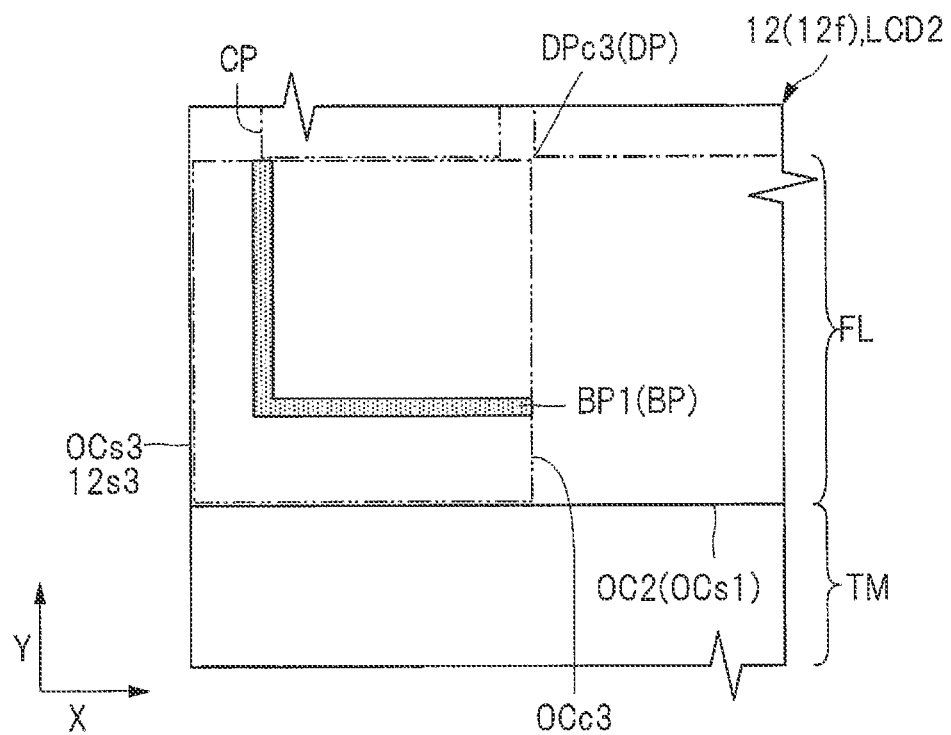
FIG. 14 is an enlarged plan view illustrating a part of a substrate opposing a region illustrated in FIG. 13 in an enlarged manner.

Details of the slits SLT illustrated in FIG. 10 will be described below. FIG. 13 is an enlarged plan view illustrating one of the four corner parts of the light shielding film BM illustrated in FIG. 10 in an enlarged manner. FIG. 14 is an enlarged plan view illustrating a part of a substrate opposing a region illustrated in FIG. 13 in an enlarged manner.

In FIG. 13, as a representative example of the corner parts BMc1, BMc2, BMc3, and BMc4 of the light shielding film BM illustrated in FIG. 10, the corner part BMc3 and its vicinities are illustrated in an enlarged manner. While illustration in an enlarged plan view of the other corner parts BMc1, BMc2, and BMc4 is omitted, a similar slit SLT to that in the corner part BMc3 is formed.

In an example illustrated in FIG. 13, the slit SLT serving as an opening formed so as to remove a part of the light shielding film BM is formed in the corner part BMc3 in the light shielding film BM. The slit SLT4 is formed so as to penetrate the light shielding film BM in the thickness direction, as illustrated in FIG. 12. Thus, the slit SLT4, which penetrates the light shielding film BM serving as an organic film in the thickness direction, is formed, to divide an entrance path of water. Even if water enters the display section DP from the peripheral edge of the light shielding film BM, therefore, the water does not reach the corner part DPc3 of the display section DP unless it bypasses the slit SLT4. Thus, a time elapsed until the water reaches the display section DP can be extended.

As illustrated in FIG. 12, in a case where the light shielding film BM is covered with the resin film OC1 serving as an organic film, if the slit SLT is formed so as to penetrate at least the light shielding film BM, water entering the display section DP via an adhesive interface between the light shielding film BM and a base material 11st or via the inside of the light shielding film BM can be reduced even when the resin film OC1 is embedded in the slit SLT. If the slit SLT is formed so as to penetrate the resin film OC1 in addition to the light shielding film BM, an entrance path of water via the inside of the resin film OC can also be blocked.

In the example illustrated in FIG. 10, one slit SLT is formed in each of the corner parts BMc1, BMc2, BMc3, and BMc4 of the light shielding film BM. As a modification example of FIGS. 10 to 14, a plurality of slits SLT can also be arranged at one corner part, like the slits SLT1 described with reference to FIG. 6. However, the number of slits SLT is preferably small from a viewpoint of suppressing leakage of light in the slits SLT.

If one slit SLT4 is formed, as illustrated in FIG. 13, the opening width of the slit SLT4 can be set to approximately 30 μm to 100 μm, for example. If the plurality of slits SLT are arranged, which are not illustrated, the respective opening widths of the plurality of slits SLT can also be set to smaller values, e.g., approximately 10 μm to 15 μm.

In the example illustrated in FIG. 13, the slit SLT4 forms an L shape along a contour of the corner part BMc3 of the light shielding film BM. When the slit SLT4 is thus formed to draw a letter L, a bypass distance during entrance of water can be made longer than when the slit SLT4 is linearly formed. A modification example of the slit SLT4 illustrated in FIG. 13 may be formed to draw a circular arc around the corner part DPc3 of the display section DP, like the slit SLT1 illustrated in FIG. 6.

Figure 15:
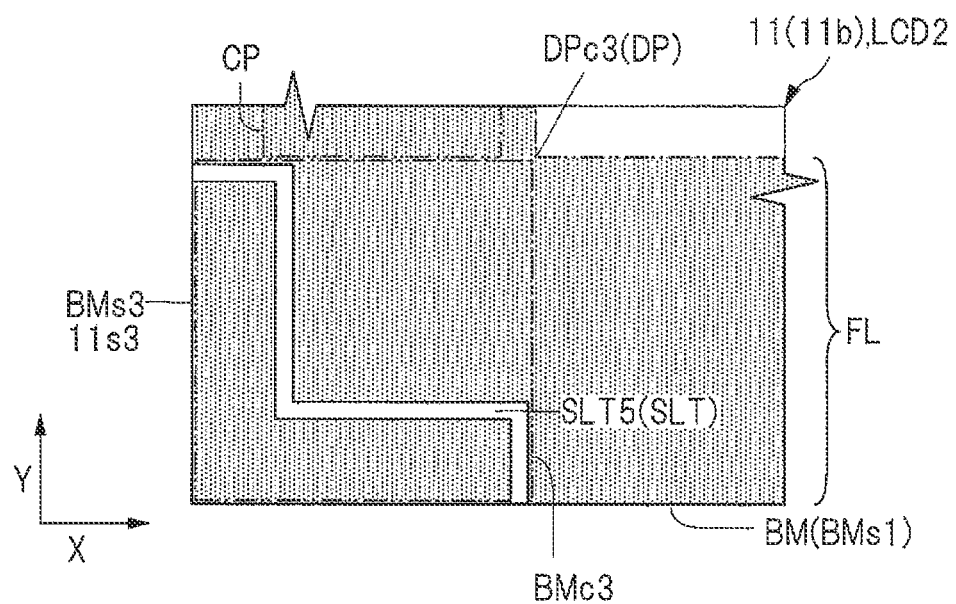
FIG. 15 is an enlarged plan view illustrating a modification example of FIG. 11.
Figure 16:
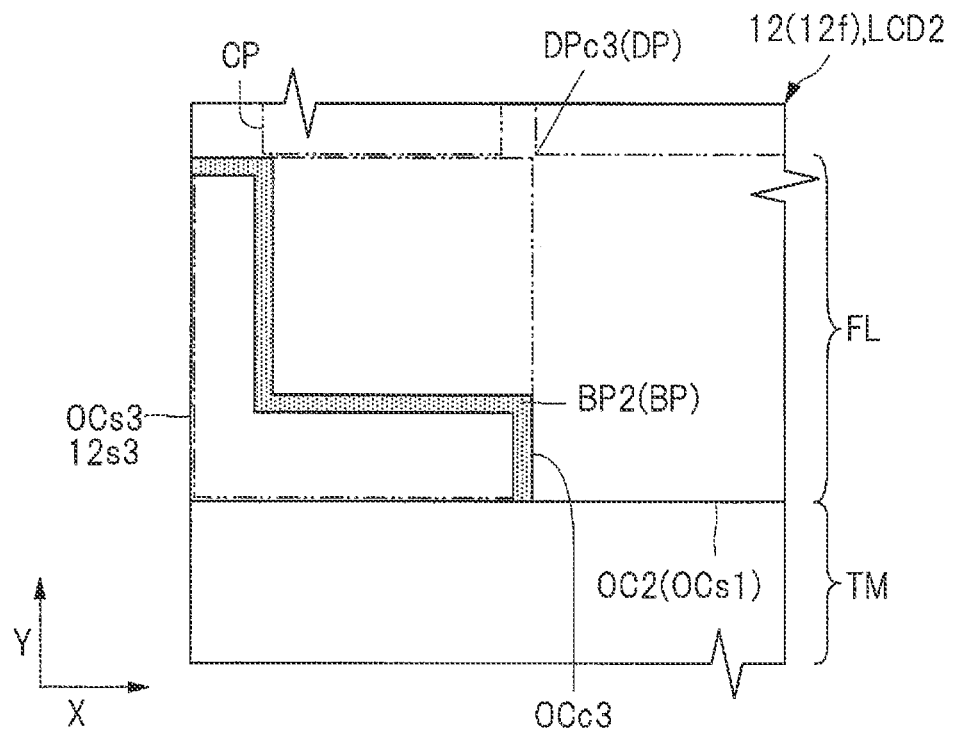
FIG. 16 is an enlarged plan view illustrating a part of a substrate opposing a region illustrated in FIG. 15 in an enlarged manner.

As a modification example of the slit SLT4 illustrated in FIG. 13, the following example will be described below. FIG. 15 is an enlarged plan view illustrating a modification example of the slit SLT4 illustrated in FIG. 13. FIG. 16 is an enlarged plan view illustrating a part of a substrate opposing a region illustrated in FIG. 15 in an enlarged manner. A slit SLT5 illustrated in FIG. 15 differs from the slit SLT4 illustrated in FIG. 13 in that both ends of an opening formed in the light shielding film BM respectively communicate with edges of the light shielding film BM. A light shielding member BP2 illustrated in FIG. 16 differs from the light shielding member BP1 illustrated in FIG. 14 in that both ends of the light shielding member BP2 respectively extend to the edges of the light shielding film BM illustrated in FIG. 15.

In the modification examples illustrated in FIGS. 15 and 16, both ends of the slit SLT5 communicate with the edges of the light shielding film BM, as in the modification examples described with reference to FIGS. 8 and 9, so that a path where water, having entered the corner part BMc3 of the light shielding film BM, bypasses can be blocked. Therefore, water, having entered a region surrounded by the slit SLT5 and the edges of the light shielding film BM, can be prevented from reaching the display section DP.

While an example in which slits SLT are respectively formed only in the four corner parts BMc1, BMc2, BMc3, and BMc4 of the light shielding film BM is illustrated in FIG. 10, various modification examples can be applied unless the circuit section CP and the light shielding member BP illustrated in FIG. 11 do not overlap each other in the thickness direction. In the example illustrated in FIG. 10, for example, the circuit section CP (see FIG. 11) is not formed in a region (i.e., a side) between the corner parts BMc1 and BMc2 of the light shielding film BM. Therefore, the slit SLT formed in the corner part BMc1 and the slit SLT formed in the corner part BMc2 may communicate with each other. In this case, water entering the side BMs2 of the light shielding film BM can be prevented from reaching the display section DP.

When a wiring for connecting the terminal TM1 and the circuit section CP illustrated in FIG. 11 needs to be formed in a region opposing the corner parts BMc3 and BMC4 arranged on the side of the terminal section TM among the four corner parts BMc1, BMc2, BMc3, and BMc4 of the light shielding film BM, the opening area of the slits SLT formed in the corner parts BMc3 and BMc4 may be small. Alternatively, there is also a modification example in which if an arrangement space of the slit SLT is difficult to be ensured in the corner parts BMc3 and BMc4, the slit SLT is not arranged in the corner parts BMc3 and BMc4 among the four corner parts BMc1, BMc2, BMc3, and BMc4 of the light shielding film BM.

The light shielding member BP illustrated in FIG. 12 need not be covered with the insulating film OC2. Therefore, any one of the slits SLT illustrated in FIG. 6, 8, or 9 can be formed in each of the four corner parts OCc1, OCc2, OCc3, and OCc4 of the insulating film OC2 illustrated in FIG. 11 by combining a configuration of a display device LCD2 and the configuration of the display device LCD1 described with reference to FIGS. 5 to 9, for example. In this case, if respective positions of the light shielding member BP illustrated in FIG. 11 and the slit SLT illustrated in FIG. 6, 8, or 9 overlap each other, a part of the light shielding member BP is exposed from the insulating film OC2 in the slit SLT.

<Details-3 of Frame Section>

As an embodiment other than the display device LCD2 described with reference to FIGS. 10 to 16, another technique for suppressing entrance of water from the periphery of an organic film formed on the side of the substrate 11 out of the substrates 11 and 12 illustrated in FIG. 4 will be described.

Figure 17:
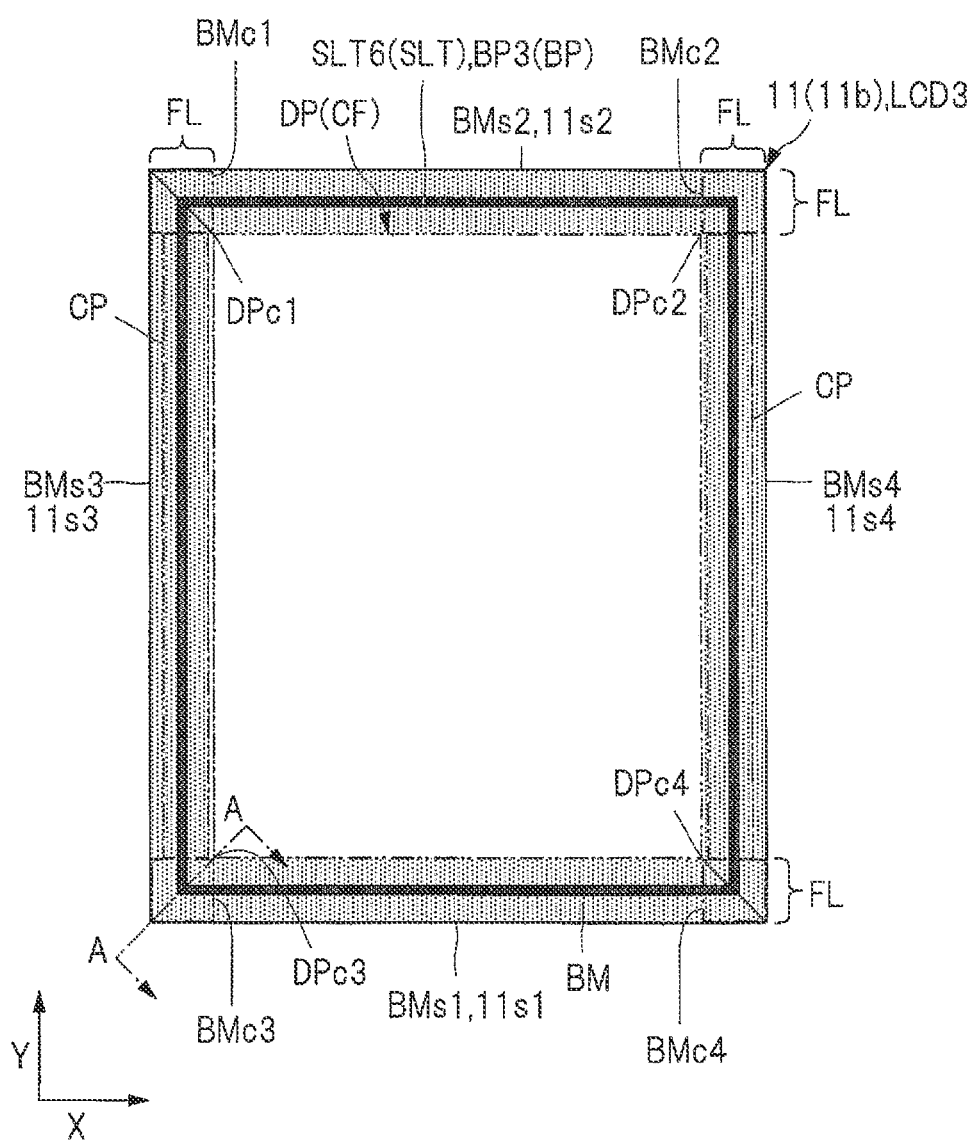
FIG. 17 is a plan view on the side of a back surface of a CF substrate serving as a modification example of FIG. 10.
Figure 18:
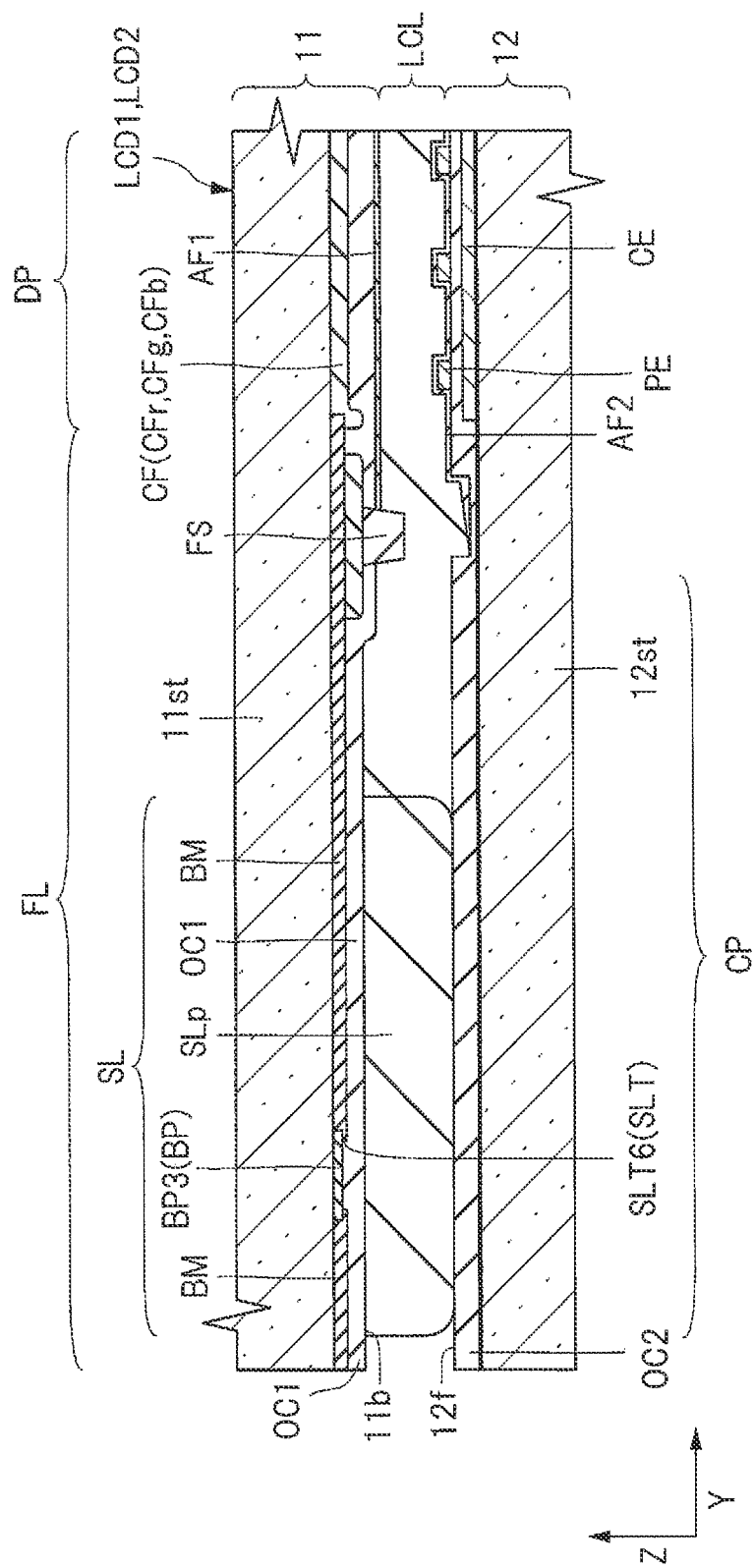
FIG. 18 is an enlarged sectional view taken along a line A-A illustrated in FIG. 17.

FIG. 17 is a plan view on the side of a back surface of a CF substrate serving as a modification example of FIG. 10. FIG. 18 is an enlarged sectional view taken along a line A-A illustrated in FIG. 17.

A display device CLD3 illustrated in FIGS. 17 and 18 differs from the display device LCD2 illustrated in FIGS. 10 and 12 in that a slit SLT6 continuously surrounding a periphery of a display section DP of the substrate 11 is formed. The slit SLT6 is formed so as to penetrate a light shielding film BM in a thickness direction. The display device LCD3 differs from the display device LCD2 illustrated in FIGS. 10 and 12 in that a light shielding member BP3 is formed in a region where the slit SLT6 is formed.

The display device LCD3 suppresses entrance of water by forming the slit SLT6 in the light shielding film BM serving as an organic film. Leakage of light is suppressed by forming the light shielding member BP3 in a portion where the slit SLT6 is formed. The light shielding member BP3 is formed of an inorganic material such as chromium or a chromium oxide. Even if the light shielding member BP3 is arranged in the portion where the slit SLT6 is formed, therefore, entrance of water can be suppressed.

As illustrated in FIG. 18, the width of the light shielding member BP3 is larger than the opening width of the slit SLT6. Therefore, both end portions of the light shielding member BP3 are covered with the light shielding film BM. Thus, both end portions of the light shielding member BP3 are covered with the light shielding member BM, so that leakage of light can be reliably prevented.

In the display device LCD3, the light shielding member BP3 is formed on the side of the substrate 11, so that the light shielding member BP is not formed in the substrate 12 illustrated in FIGS. 3 and 4. Therefore, a circuit section CP and the slit SLT6 may overlap each other, as illustrated in FIG. 17, so that the slit SLT6 can be formed so as to continuously surround a periphery of the display section DP. Therefore, not only entrance of water into corner parts of the display section DP, but also entrance of water into each of the sides of the display section DP can be suppressed.

In the display device LCD3, the light shielding member BP need not be formed on the side of the substrate 12. Therefore, a configuration of the display device LCD3 illustrated in FIGS. 17 and 18 and the configuration of the display device LCD1 described with reference to FIGS. 5 to 9 can be easily applied in combination.

In the foregoing, the invention made by the inventors of the present invention has been concretely described based on the embodiments. However, it is needless to say that the present invention is not limited to the foregoing embodiments and various modifications and alterations can be made within the scope of the present invention. Although a display device using a liquid crystal layer as a display functional layer is discussed in the above-described embodiment, for example, the present invention is not limited thereto. For example, the above-described technique can also be applied to a frame section of a display device of a so-called an Organic Electro-Luminescence (EL) type using a light emitting element composed of an organic compound as a display functional layer.

In the category of the idea of the present invention, a person with ordinary skill in the art can conceive various modified examples and revised examples, and such modified examples and revised examples are also deemed to belong to the scope of the present invention. For example, the examples obtained by appropriately making the additions, deletions or design changes of components or the additions, deletions or condition changes of processes to respective embodiments described above by a person with ordinary skill in the art also belong to the scope of the present invention as long as they include the gist of the present invention.

The present invention is usable for a display device such as a liquid crystal display and an electronic apparatus that incorporates the display device.

What is claimed is:

1. A display device including a display section and a frame section surrounding the display section, the display device comprising:
    a first substrate;
    a light shielding film provided on the first substrate;
    a second substrate opposed to the first substrate;
    a plurality of conductor patterns provided on the second substrate; and
    a first organic film covering the conductor patterns,
    wherein the light shielding film is formed up to an edge of the first substrate,
    a slit which penetrates the light shielding film in a thickness direction is formed in the light shielding film, and is disposed at a corner portion of the first substrate in a plan view,
    the edge of the first substrate has a first edge and a second edge extending in a direction crossing the first edge,
    the slit has a first slit extending along the first edge and a second slit extending along the second edge,
    the first slit is formed up to the second edge in the plan view,
    the second slit is formed up to the first edge in the plan view,
    one of the conductor patterns is disposed at a position overlapping the first slit and the second slit,
    in the plan view, the light shielding film has a first portion and a second portion, and
    the first portion and the second portion are separated from each other by the first slit and the second slit.

2. The display device according to claim 1,
    the frame section has a first virtual line extending along the first edge and a second virtual line extending along the second edge,
    the first virtual line and the second virtual line are extensions of contour lines of the display section, and
    the corner portion is a region surrounded by the first virtual line, the second virtual line, the first edge, and the second edge.

3. The display device according to claim 1,
    wherein the slit is formed up to the edge of the first substrate.

4. The display device according to claim 1,
    wherein the first slit and the second slit are connected to each other.

5. The display device according to claim 1,
    wherein the light shielding film composed of an organic material.

6. The display device according to claim 1,
    wherein a width of the one of the conductor patterns is larger than a width of the slit, in the plan view.

7. The display device according to claim 1,
    wherein the slit is formed only in the corner portion.

* * * * *